United States Patent [19]

Raisin et al.

[11] Patent Number: 4,553,976
[45] Date of Patent: Nov. 19, 1985

[54] PROCESS FOR DYEING OR PRINTING POLYAMIDE FIBRES

[75] Inventors: Helmut Raisin, Riehen; Bernard C. Teutelink, Birsfelden, both of Switzerland

[73] Assignee: Ciba-Geigy Corporation, Ardsley, N.Y.

[21] Appl. No.: 570,255

[22] Filed: Jan. 12, 1984

Related U.S. Application Data

[63] Continuation-in-part of Ser. No. 470,493, Feb. 28, 1983, abandoned.

[30] Foreign Application Priority Data

Jan. 13, 1983 [CH] Switzerland .......................... 176/83

[51] Int. Cl.$^4$ .......................... C09B 1/34; D06P 3/14; D06P 5/20
[52] U.S. Cl. .......................... 8/639; 8/641; 8/643; 8/683; 8/685; 8/686; 8/924
[58] Field of Search .................. 8/639, 641, 643, 685, 8/686

[56] References Cited

U.S. PATENT DOCUMENTS

| | | | |
|---|---|---|---|
| 3,170,757 | 2/1965 | Gift et al. | 8/55 |
| 3,468,618 | 9/1969 | Buehler et al. | 8/436 |
| 3,521,989 | 7/1970 | Angliss et al. | 8/591 |
| 4,051,116 | 9/1977 | Dore | 260/145 A |
| 4,085,097 | 4/1978 | Beffa et al. | 260/145 A |
| 4,118,381 | 10/1978 | Fuchs et al. | 260/176 |
| 4,380,451 | 4/1983 | Steinberger et al. | 8/477 |
| 4,408,995 | 10/1983 | Guth et al. | 8/477 |

FOREIGN PATENT DOCUMENTS

| | | |
|---|---|---|
| 55808 | 7/1982 | European Pat. Off. . |
| 61670 | 10/1982 | European Pat. Off. . |
| 2918633 | 11/1980 | Fed. Rep. of Germany . |
| 3023664 | 1/1982 | Fed. Rep. of Germany . |
| 3200146 | 10/1982 | Fed. Rep. of Germany . |
| 930429 | 7/1963 | United Kingdom . |
| 1137748 | 12/1968 | United Kingdom . |
| 1206295 | 9/1970 | United Kingdom . |
| 1214194 | 12/1970 | United Kingdom . |
| 2041010 | 9/1980 | United Kingdom . |

OTHER PUBLICATIONS

*American Dyestuff Reporter,* vol. 67 (Jun. 1978), pp. 27, 30, 31 and 34.
*Journal of the Society of Dyers and Colourists,* vol. 97, pp. 262–274.

*Primary Examiner*—A. Lionel Clingman
*Attorney, Agent, or Firm*—Wenderoth, Lind & Ponack

[57] ABSTRACT

The invention describes a process for dyeing or printing natural or synthetic polyamide fibre material by a rapid fixation method, which comprises the use of dyes or mixtures of dyes of the formulae as defined in the description in a continuous dyeing method or printing method, and fixing the dyes or prints by steaming for less than 3 minutes such that at least 95% fixation of the dyes is achieved. The process is particularly suitable for combination dyeing and polyamide carpet printing, and produces level dyeings and prints having excellent fastness properties.

14 Claims, No Drawings

PROCESS FOR DYEING OR PRINTING POLYAMIDE FIBRES

CROSS REFERENCE TO RELATED APPLICATION

This is a continuation-in-part of our copending application Ser. No. 470,493 filed Feb. 28, 1983 (now abandoned).

In the continuous dyeing and printing methods conventionally employed in practice for polyamide fibre materials, the dye applied to the substrate is fixed by steaming with saturated steam at about 100° C., and in printing methods conveniently with superheated steam at 105° to 110° C., the steaming times being from 5 to 10 minutes. However, such lengthy steaming times permit only low production speeds and have therefore the disadvantage of being uneconomic.

It is the object of the present invention to provide a process for the continuous dyeing or printing of polyamide fibres, together with a selection of suitable dyes, which process makes it possible to fix the dyes by steaming them for significantly shorter times than those conventionally employed in the prior art.

The dyes to be used in the process of the invention should constitute a selection which contains the most important colours of the visible spectrum, so that a complete range can be made available to the dyer. Furthermore, it should be possible to use the dyes uniformly in the novel process, so as to produce deep, level dyeings or prints having good lightfastness and wetfastness properties.

The dyes should in particular be highly compatible with one another, so that it is possible to obtain any desired shade by dyeing with mixtures, for example by the trichromatic dyeing method.

It has been found that the process described below meets the foregoing requirements.

Accordingly, the present invention provides a process for dyeing or printing natural or synthetic polyamide fibres by a rapid fixation method, which process comprises the use of dyes or mixtures of dyes of the formulae

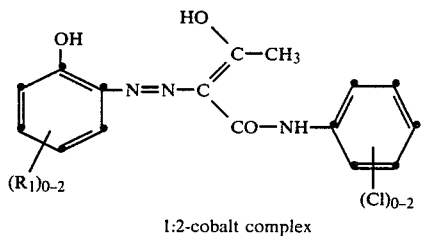

1:2-cobalt complex wherein $(R_1)_{0-2}$ reresents 0 to 2 substituents $R_1$ which may each independently be $C_1$-$C_4$alkyl, $C_1$-$C_4$alkoxy, halogen, nitro, sulfamoyl, N—$C_1$-$C_4$alkylsulfamoyl, N—$C_1$-$C_2$alkoxy-$C_1$-$C_2$alkylsulfamoyl, phenylaminosulfonyl, carboxyphenylamoinosulfonyl, $C_1$-$C_4$alkylsulfonyl or acetylamino;

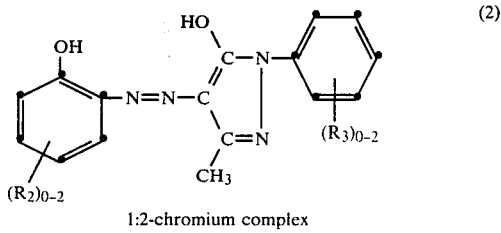

1:2-chromium complex wherein $(R_2)_{0-2}$ represents 0 to 2 substituents $R_2$ which may each independently be $C_1$-$C_4$alkyl, $C_1$-$C_4$alkoxy, halogen, nitro, sulfamoyl, N—$C_1$-$C_4$alkylsulfamoyl, N—$C_1$-$C_2$alkoxy-$C_1$-$C_3$alkylsulfamoyl, phenylaminosulfonyl, carboxyphenylaminosulfonyl, $C_1$-$C_4$alkylsulfonyl or acetylamino, and $(R_3)_{0-2}$ represents 0 to 2 substituents $R_3$ which may each independently be halogen, $C_1$-$C_4$alkyl, cyano or sulfamoyl; 1:2 cobalt complex of the dyes of the formula (2), wherein $R_2$ has the same meaning as in the 1:2 chromium complexes and $(R_3)_{0-2}$ represents 0 to 2 substituents $R_3$ which may each independently be halogen, cyano or sulfamoyl;

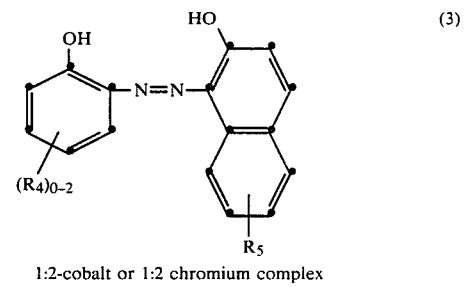

1:2-cobalt or 1:2 chromium complex wherein $R_4$ has the same meaning as $R_1$ in formula (1), and $R_5$ is hydrogen, acetylamino, methoxycarbonylamino or methylsulfonylamino;

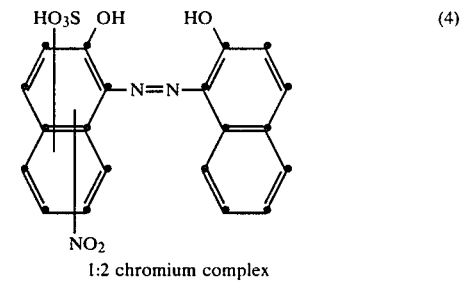

1:2 chromium complex

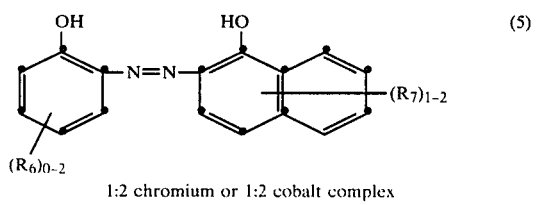

1:2 chromium or 1:2 cobalt complex wherein $R_6$ has the same meaning as $R_1$ in formula (1), and $(R_7)_{1-2}$ represents 1 to 2 substituents $R_7$ which may each independently be halogen, methyl, methoxy or sulfo, or wherein 2 adjacent substituents $R_7$ are able to form a closed bridge member —$SO_2$—$CH_2$—O—;

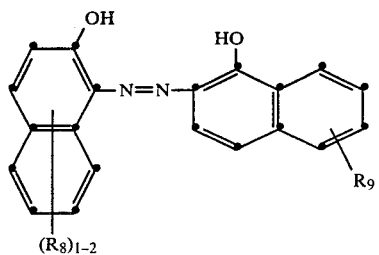

1:2 cobalt or 1:2 chromium complex wherein $(R_8)_{1-2}$ represents 1 to 2 substituents $R_8$ which may each independently be sulfo or nitro and $R_9$ is hydrogen or hydroxy;

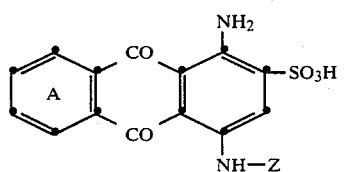

wherein Z is the radical of the formula

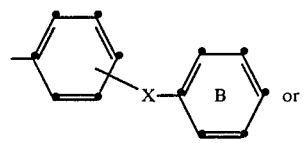

or

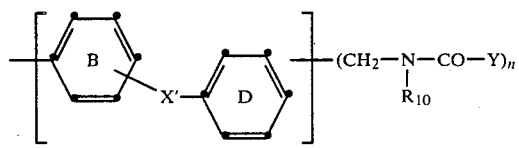

wherein X is the $-O-SO_2-$, $-NH-SO_2$ or $-NH-CO-$ group and X' is oxygen or sulfur, $R_{10}$ is hydrogen or $C_1-C_4$alkyl, Y is an unsubstituted or substituted aryl radical, n is 1, 2 or 3, the benzene ring A may be substituted by halogen and the benzene rings B and D may each independently be substituted by halogen, $C_1-C_4$alkyl, $C_1-C_4$alkoxy or by a radical of the formula $-(O-CH_2CH_2-O-)R_{11}$, wherein $R_{11}$ is hydrogen, methyl or ethyl;

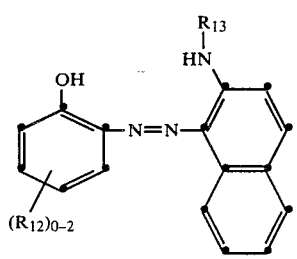

1:2 cobalt complex wherein $R_{12}$ has the same meaning as $R_1$ in formula (1), and $R_{13}$ is hydrogen or phenyl;

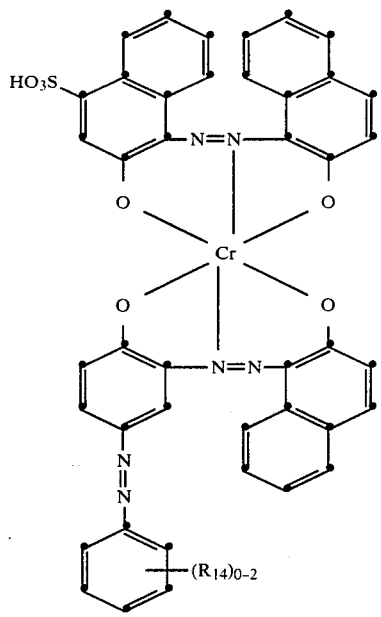

wherein $(R_{14})_{0-2}$ represents 0 to 2 substituents $R_{14}$, which may each independently be $C_1-C_4$alkyl, $C_1-C_4$alkoxy, halogen, carboxy or sulfo; and

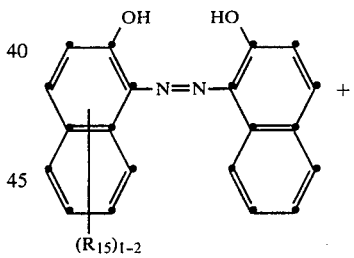

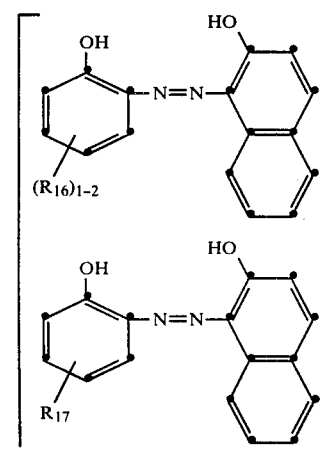

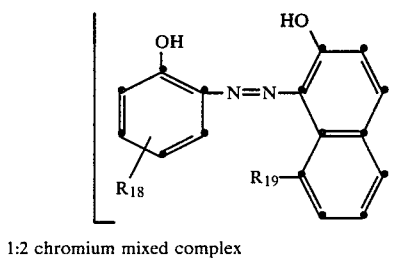

1:2 chromium mixed complex wherein $(R_{15})_{1-2}$ represents 1 to 2 substituents $R_{15}$, which may each independently be sulfo or nitro, $(R_{16})_{1-2}$ represents 1 to 2 substituents $R_{16}$, which may each independently be nitro, halogen, methyl or acetylamino, $R_{17}$ has the same meaning as $R_{16}$, independently thereof, $R_{18}$ has the same meaning as $R_{16}$, independently thereof, and $R_{19}$ is acetylamino, methoxycarbonylamino, ethoxycarbonylamino, methylsulfonylamino or N,N-dimethylaminosulfonyl; 1:2 cobalt mixed complexes of the dyes of the formulae (2) and (3) or (4) and (8); in a continuous dyeing process or printing method, and fixing the dyeings or prints by steaming for less then 3 minutes, during which time at least 95% fixation of the dyes is achieved.

The following radicals, provided they fall within the scope of the respective definitions of the relevant formulae, and each independently, are suitable substituents $R_1$, $R_2$, $R_3$, $R_4$, $R_6$, $R_7$, $R_{10}$, $R_{12}$ and $R_{14}$ in the formulae (1) to (10).

As $C_{1-4}$alkyl: methyl, ethyl, propyl, isopropyl, butyl, isobutyl, sec-butyl or tert-butyl; as $C_{1-4}$alkoxy: methoxy, ethoxy, propoxy, isopropoxy, butoxy, isobutoxy, sec-butoxy or tert-butoxy; as halogen: fluorine, chlorine or bromine; as N—$C_{1-4}$alkylsulfamoyl: N-methylsulfamoyl, N-ethylsulfamoyl, N-propylsulfamoyl, N-isopropylsulfamoyl, N-butylsulfamoyl, N-isobutylsulfamoyl, N-sec-butylsulfamoyl or N-tert-butylsulfamoyl; as N—$C_{1-2}$alkoxy-$C_{1-2}$alkylsulfamoyl: N-methoxymethylsulfamoyl, N-$\beta$-methoxyethylsulfamoyl, N-ethoxymethylsulfamoyl or N-$\beta$-ethoxyethylsulfamoyl; and as $C_{1-4}$alkylsulfonyl: methylsulfonyl, ethylsulfonyl, propylsulfonyl, isopropylsulfonyl, butylsulfonyl, isobutylsulfonyl, sec-butylsulfonyl or tert-butylsulfonyl.

If adjacent substituents $R_7$ form a closed bridge member —$SO_2$—$CH_2$—O—, it will be bonded in the o,m-position to the azo group.

The aryl radical Y in formula (7) is e.g. a benzene, naphthalene, diphenyl, diphenyl ether, diphenylamine or diphenyl ketone radical. The aryl radical Y can be further substituted, for example by $C_1$-$C_4$alkyl groups such as methyl, ethyl, propyl, isopropyl, butyl, isobutyl, sec-butyl or tert-butyl; by $C_1$-$C_4$alkoxy groups such as methoxy, ethoxy, propoxy, isopropoxy, butoxy, isobutoxy, sec-butoxy or tert-butoxy or phenoxy; $C_2$-$C_4$alkanoylamino groups such as acetylamino or propionylamino or benzoylamino; amino groups such as —$NH_2$, methylamino, ethylamino, dimethylamino, diethylamino, cyanoethylamino, hydroxyethylamino, dihydroxyethylamino, cyclohexylamino, benzylamino or phenylamino; carboxylic acid ester groups such as methoxycarbonyl or ethoxycarbonyl; trifluoromethyl, nitro, cyano, acetyl, methylsulfonyl, carbamoyl, sulfamoyl, ureido, hydroxyl, carboxyl, sulfo or sulfomethyl groups; or by halogen such as fluorine, chlorine or bromine.

The dyes of the formula (7) can contain 1 to 3 aroylaminomethyl radicals, which are attached to the benzene ring B and/or to the benzene ring D.

A suitable halogen substituent at the benzene ring A is fluorine, chlorine or bromine, and is preferably in the 6- or 7-position.

Possible substitutents at the benzene rings B and D are fluorine, chlorine, bromine, methyl, ethyl, propyl, isopropyl, butyl, isobutyl, sec-butyl, tert-butyl, methoxy, ethoxy, propoxy, isopropoxy, butoxy, isobutoxy, sec-butoxy, tert-butoxy, $\beta$-hydroxyethoxy, $\beta$-methoxyethoxy, $\beta$-($\beta'$-methoxyethoxy)ethoxy and $\beta$-($\beta'$-ethoxyethoxy)ethoxy.

Preferred dyes of the formula (7) are those in which X' is oxygen, $R_{10}$ is hydrogen or $C_{1-4}$alkyl, Y is phenyl, diphenyl or naphthyl which can be substituted by halogen, nitro, $C_{1-4}$alkyl or $C_{1-4}$alkoxy, and n is 1 or 2, the benzene ring A can be substituted by chlorine, and the benzene rings B and D may each independently be substituted by halogen, $C_{1-4}$alkyl, $C_{1-4}$alkoxy or by a radical of the formula —(O—$CH_2CH_2$)—O—$R_{11}$, in which $R_{11}$ is hydrogen, methyl or ethyl.

A preferred embodiment of the process of the invention comprises the use of dyes or mixtures of dyes of the formulae (1) 1:2 cobalt complex, wherein $R_1$ is nitro, sulfamoyl, N-methylsulfamoyl, methylsulfonyl, carboxyphenylaminosulfonyl or N-($\beta$-methoxyethyl)sulfamoyl;

(2) 1:2 chromium complex, wherein $R_2$ is chlorine, nitro, sulfamoyl or N-methylsulfamoyl, and $R_3$ is chlorine, methyl or sulfamoyl;

(2) 1:2 cobalt complex, wherein $R_2$ is chlorine, nitro, sulfamoyl or N-methylsulfamoyl, and $R_3$ is chlorine, cyano or sulfamoyl;

(3) 1:2 cobalt or 1:2 chromium complex, wherein $R_4$ is methyl, methoxy, chlorine, nitro, sulfo, sulfamoyl, N—$C_1$-$C_3$alkylsulfamoyl, N-$\beta$-methoxyethylsulfamoyl, phenylaminosulfonyl, methylsulfonyl or acetylamino, and $R_5$ is hydrogen, acetylamino, methoxycarbonylamino or methylsulfonylamino;

(4) 1:2 chromium complex;

(5) 1:2 chromium or 1:2 cobalt complex, wherein $R_6$ is nitro, chlorine, sulfamoyl, N-methylsulfamoyl or N-ethylsulfamoyl, and $R_7$ is chlorine, methyl, methoxy or sulfo, or wherein 2 adjacent substituents $R_7$ are able to form a closed bridge member —$SO_2$—$CH_2$—O—;

(6) 1:2 cobalt or 1:2 chromium complex, wherein $R_8$ is as defined for formula (6) and $R_9$ is hydrogen;

(7) wherein X is as defined for formula (7), the benzene ring A is unsubstituted and the benzene ring B can be substituted by methyl or methoxy, or wherein X' is oxygen, $R_{10}$ is hydrogen, Y is phenyl, and n is 1 or 2, the benzene ring A is unsubstituted and the benzene rings B and D can each independently be substituted by chlorine, methyl or methoxy.

(8) 1:2 cobalt complex, wherein $R_{12}$ is methoxy, chlorine, nitro, sulfo or sulfamoyl;

(9) wherein $R_{14}$ is methyl, methoxy, ethoxy, chlorine, carboxy or sulfo;

(10) 1:2 chromium mixed complex, wherein $R_{15}$ is as defined for formula (10), $R_{16}$, $R_{17}$ and $R_{18}$ are each independently nitro, chlorine, methyl or acetylamino, and $R_{19}$ is as defined for formula (10); or 1:2 cobalt mixed complexes of dyes of the formulae (2) and (3) or (4) and (8).

A particularly preferred embodiment of the process of this invention comprises the use of dyes or mixtures of dyes of the formulae

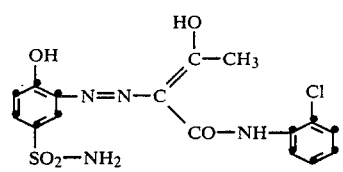
1:2 cobalt complex (11)

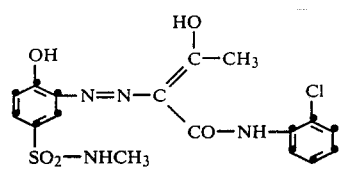
1:2 cobalt complex (12)

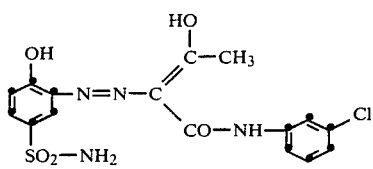
1:2 cobalt complex (13)

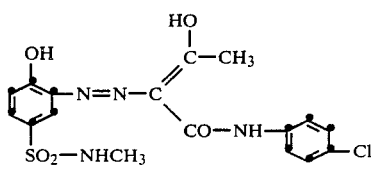
1:2 cobalt complex (14)

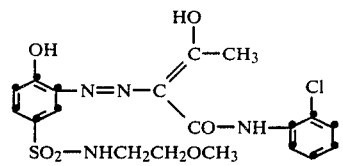
1:2 cobalt complex (15)

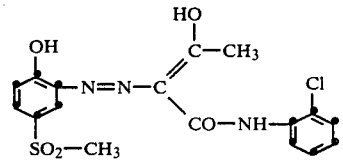
1:2 cobalt complex (16)

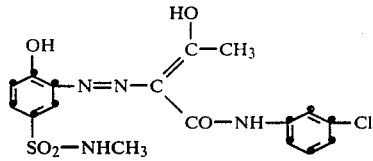
1:2 cobalt complex (17)

-continued

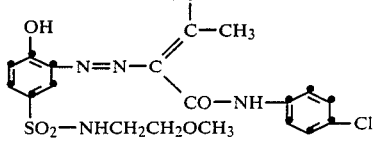
1:2 cobalt complex (18)

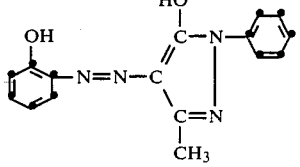
1:2 chromium complex (19)

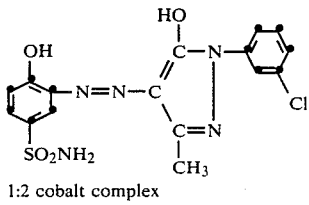
1:2 cobalt complex (20)

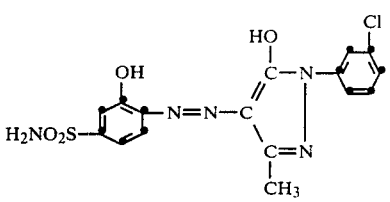
1:2 chromium complex (21)

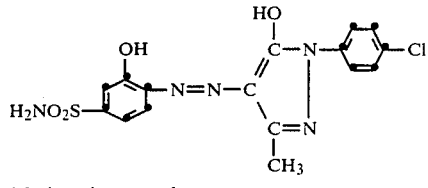
1:2 chromium complex (22)

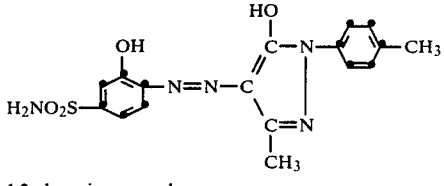
1:2 chromium complex (23)

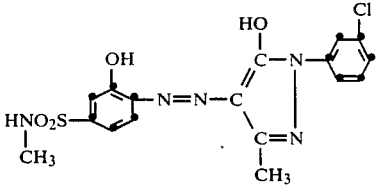
1:2 chromium complex (24)

-continued
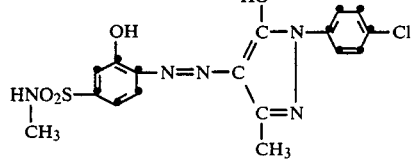
1:2 chromium complex (25)
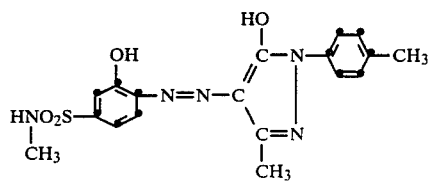
1:2 chromium complex (26)
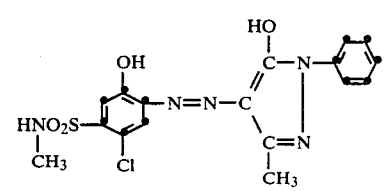
1:2 chromium complex (27)
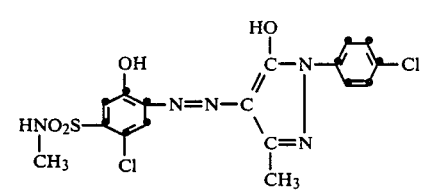
1:2 chromium complex (28)
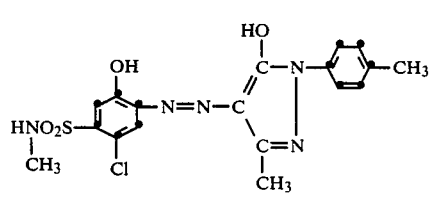
1:2 chromium complex (29)
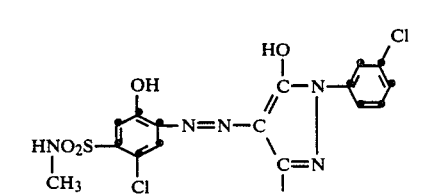
1:2 chromium complex (30)
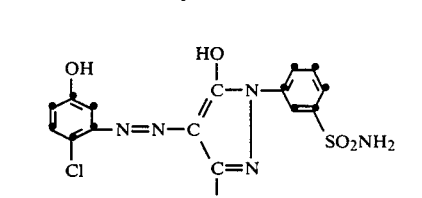
1:2 chromium complex (31)
-continued
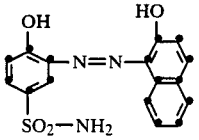
1:2 cobalt complex (32)
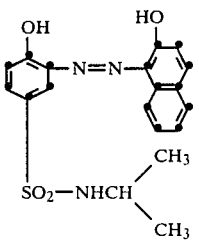
1:2 cobalt complex (33)
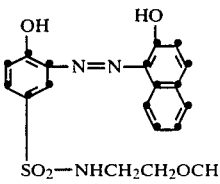
1:2 cobalt complex (34)
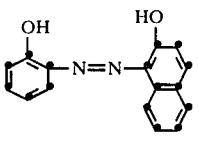
1:2 cobalt complex (35)
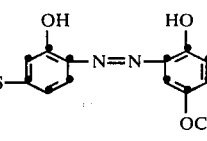
1:2 chromium complex (36)
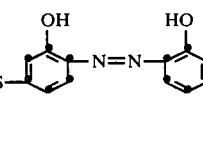
1:2 chromium complex (37)
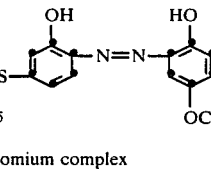
1:2 chromium complex (38)
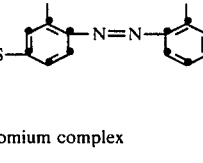
1:2 chromium complex (39)

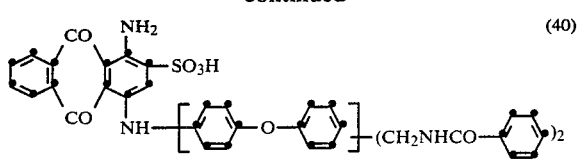 (40)

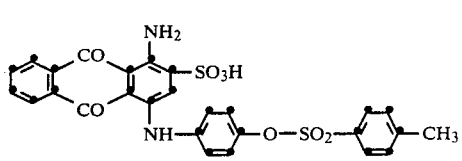 (41)

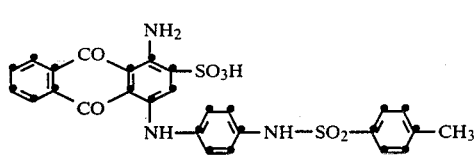 (42)

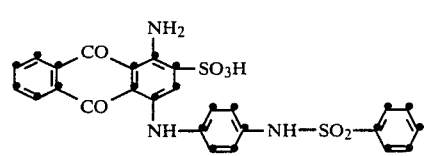 (43)

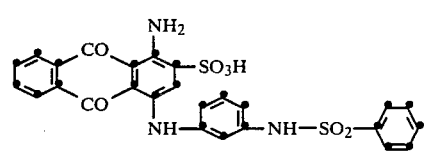 (44)

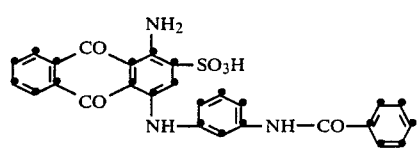 (45)

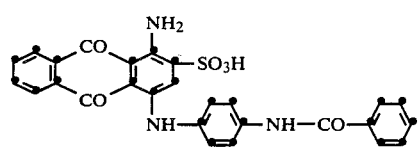 (46)

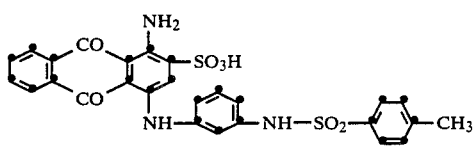 (47)

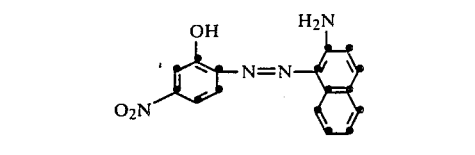 (48)

1:2 cobalt complex

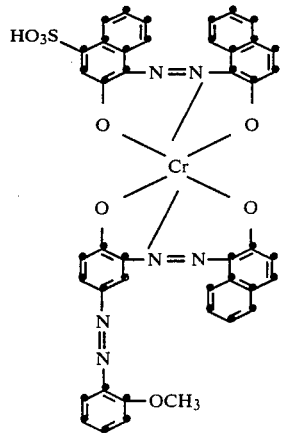 (49)

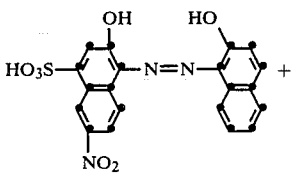 (50)

1:1 chromium complex

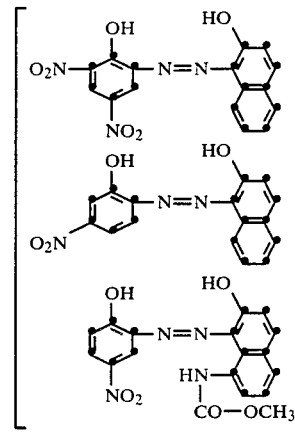

or the 1:2 cobalt mixed complex of the dyes of the formulae (31), (32) and (33).

It is preferred to use the 1:2 cobalt complexes of the formulae (11), (13), (20), (32), (33), (34) and (35), the 1:2 chromium complexes of the formulae (19), (49) and (50), and the 1:2 cobalt complex of the dyes of the formulae (31), (32) and (33) or mixtures thereof.

The dyes of the formulae (1) to (6), (8) to (39) and (41) to (50) are known, or they can be prepared by the same methods as for known dyes. The dyes of the formulae (7) and (40) are novel. They can be prepared by methods similar to those described in German Pat. Nos. 1 189 669 and 1 810 156, by reacting an anthraquinone compound of the formula

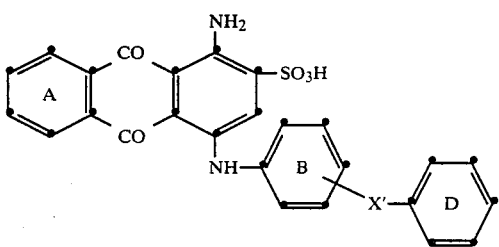

(51)

with n moles of a compound which introduces the radical of the formula

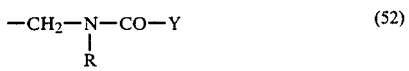

(52)

The compound used to introduce the radical of the formula (52) is preferably an N-methylolamide of the formula

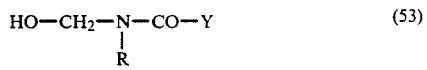

(53)

or a compound which reacts like these methylol compounds and is a functional derivative of a compound containing a methylol group.

The starting anthraquinone compounds of the formula (51) can be prepared in known manner by condensing 1-amino-4-bromoanthraquinone-2-sulfonic acid with appropriate aminodiphenyl ethers or aminodiphenyl thioethers.

The dyes of the formulae (1) to (50) are also suitable for dyeing and printing in mixtures to obtain combination shades. A preferred embodiment of the process of this invention for producing combination shades comprises the use of dye mixtures which contain 3 or 4 dyes selected from the group consisting of the dyes of the formulae (1) to (10) or of the formulae (11) to (50).

Dyes of the formula (1) to (50) are particularly suitable for dyeing or printing by the trichromatic technique.

The trichromatic technique will be understood as meaning the additive mixing of suitably chosen yellow or orange, red and blue dyes with which any desired shade of the visible colour spectrum can be obtained by mixing the dyes in the appropriate ratios.

It is preferred to use a mixture of 3 or 4 suitably chosen yellow or orange, red and blue dyes selected from the group consisting of the dyes of the formulae (1) to (10) or of the formulae (11) to (50) for trichromatic dyeing or printing.

Such a mixture of dyes for trichromatic deing or printing contains in particular a dye of the formula (7) or (14) to (47).

The dyes used in the process of this invention are distinguished in trichromatic dyeing or printing by uniform build-up, good exhaustion properties, good colour consistency even in various concentrations, good fastness properties and, in particular, very good compatibility.

If the process is carried out with mixtures of dyes of the formulae (1) to (10) or (11) to (50), these mixtures can be prepared by mixing the individual dyes. Mixing is effected, for example, in suitable mills, for example ball mills and pin mills, and in kneaders or mixers.

The mixtures can also be prepared by spray-drying the aqueous dye mixtures.

The dye mixtures of the invention are distinguished by good general properties, for example good solubility, cold-solution stability, good exhaustion properties and, in particular, by good compatibility with other dyes.

If the dyes used in the process of the invention contain sulfo groups, the dyes are either in the form of the free sulfonic acid or, preferably, of their salts.

Examples of suitable salts are the alkali metal, alkaline earth metal or ammonium salts and the salts of an organic amine. Typical examples are the sodium, lithium, potassium or ammonium salts, and the salt of triethanolamine.

The dyes used in the process of the invention usually contain further ingredients, for example sodium chloride or dextrin.

The dyes or dye mixtures are used in aqueous dye liquors or printing pastes.

The dye liquors or printing pastes can also contain further ingredients, for example wetting agents, antifoams, levelling agents or textile auxiliaries, for example softeners, flame retardants, or dirt, water or oil repellants, and water softeners and natural or synthetic thickeners, for example alginates or cellulose ethers.

The dyebaths may additionally contain mineral acids, e.g. sulfuric acid or phosphoric acid, or organic acids, preferably lower aliphatic carboxylic acids such as formic, acetic, citric or oxalic acid. The acids are used in particular for adjusting the pH of the liquors used in the process of the invention.

The dye liquor can also contain salts, in particular an ammonium or alkali metal salt, for example ammonium sulfate, ammonium or sodium acetate, or preferably sodium sulfate. It is preferred to use 0.1 to 10 percent by weight of ammonium sulfate or of an alkali metal sulfate, based on the fibre material.

Depending on the desired depth of shade, the amounts in which the dyes are used in the dyebath can vary within wide limits. In general, amounts of 0.001 to 10 percent by weight, based on the goods, of one or more dyes have been found to be advantageous.

The process of the invention is suitable for use in conventional continuous deing or printing methods, and all conventional dye applicators, for example those equipped with ink rollers, or a padder, or printing machines can be used.

The dye is fixed with saturated steam at about 100° C., or, if appropriate, with superheated steam at 105° to 110° C., in steamers through which the goods are passed continuously.

In the process of this invention, steaming times of less than 3 minutes are used. In particular, the dye is fixed by steaming for 1 to 2 minutes. If superheated steam is used, the steaming time can in some cases be shortened still further.

The dyes which are eligible for use in the process of the invention have a degree of fixation of at least 95% under the specified processing conditions.

The process is particularly suitable for dyeing from short liquors in the continuous dyeing method or continuous foam dyeing method.

The process of the invention is suitable for dyeing or printing not only natural polyamide materials, for example wool, but also, in particular, synthetic polyamide materials, for example perlon or nylon, and it is suitable for dyeing or printing wool and synthetic polyamide blends or yarns.

The textile material can be dyed in a very wide variety of make-up states, for example fibres, yarns, or woven or knitted fabrics, or, in particular, in the form of carpets.

Further, the process can also be used for continuous dyeing or printing by the space-dyeing method.

Compared with the known methods of dyeing or printing fibre material made of natural or synthetic polyamides, the process of this invention has not only the advantages already mentioned but also the following ones. It offers a limited selection of dyes which are highly compatible and have short fixing times of, preferably, 1 to 2 minutes. The dyeings or prints produced are very level and have good light- and wetfastness properties, and have sharper contours where colours overlap. It is surprising that the selected dyes of the formula (1) to (10) or (11) to (50) are fixed so completely and uniformly by steaming for less than 3 minutes, preferably for only 1 to 2 minutes, that the high levelness and wetfastness requirements demanded by the present state of the art with respect to polyamide dyeings are met. The advance in the art is, in particular, the fact that the shorter fixing times make possible production speeds which are higher than hitherto.

The invention is illustrated by the following examples in which parts and precentages are by weight. Parts by weight relate to parts by volume as the gram relates to the cubic centimeter. In the following examples, the requirements of the automotive industry will be understood as meaning, e.g. good light- and wetfastness properties of the dyed material.

EXAMPLE 1

A nylon 6 or 66 velour or loop pile floor-covering material which has a weight of 350 to 1200 g/m² is printed with a paste which contains
(a) 0.5 part of a dye of the formula (12) as 1:2 cobalt complex,
(b) 1 part of a dye of the formula (32) as 1:2 cobalt complex,
(c) 0.1 part of a mixture obtained from 1-amino-6-nitro-2-naphthol-4-sulfonic acid→β-naphthol, reacted to give the 1:1 chromium complex, which is reacted with equal parts of 2-amino-5-nitrophenol→β-naphthol, 2-amino-4-nitrophenol→8-methoxycarbonylamino-2-naphthol and 2-amino-4,6-dinitrophenol→β-naphthol to give the 1:2 chromium mixed complex,
(d) 494.4 parts of water,
(e) 500 parts of a guar flour derivative, 4%,
(f) 3 parts of a coacervating agent, and
(g) 1 part of an antifoam,
and has been adjusted to a pH of 3.5 with citric acid.

The printed goods are steamed for 2 minutes with saturated steam at 101° C., then rinsed and dried, to give a uniformly and completely fixed bordeaux print with sharp contours and good fastness properties.

Similar results are obtained with the following dyes or with mixtures thereof:

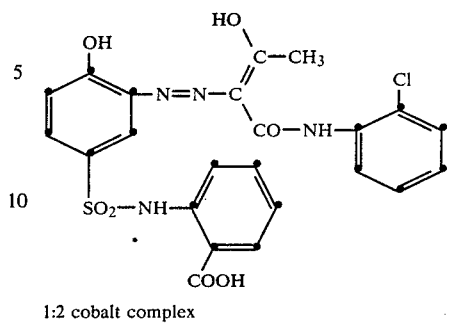

1:2 cobalt complex

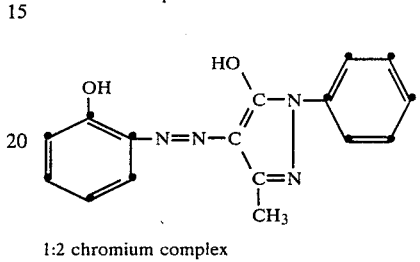

1:2 chromium complex

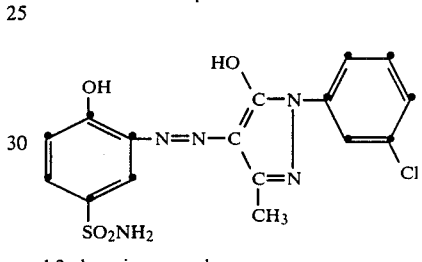

1:2 chromium complex

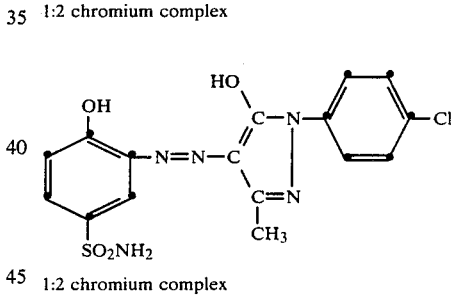

1:2 chromium complex

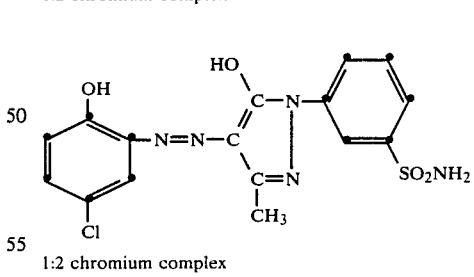

1:2 chromium complex

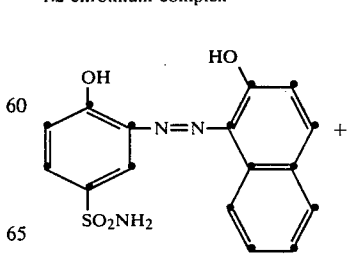

1:2 cobalt mixed complex

-continued

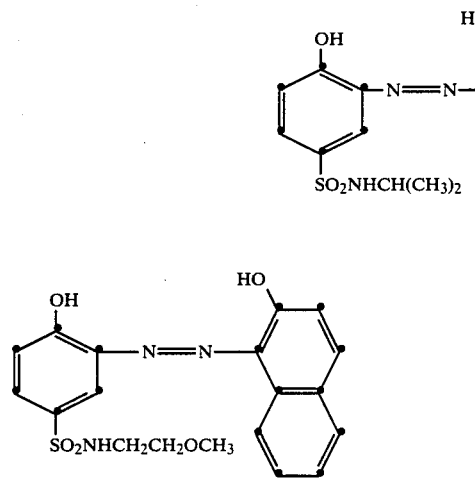

1:2 cobalt complex.

Dye of the formula (40)

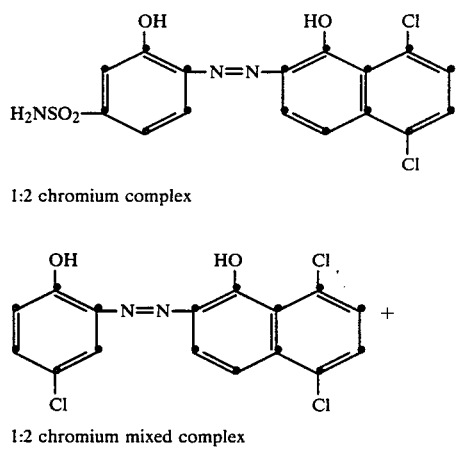

1:2 chromium complex

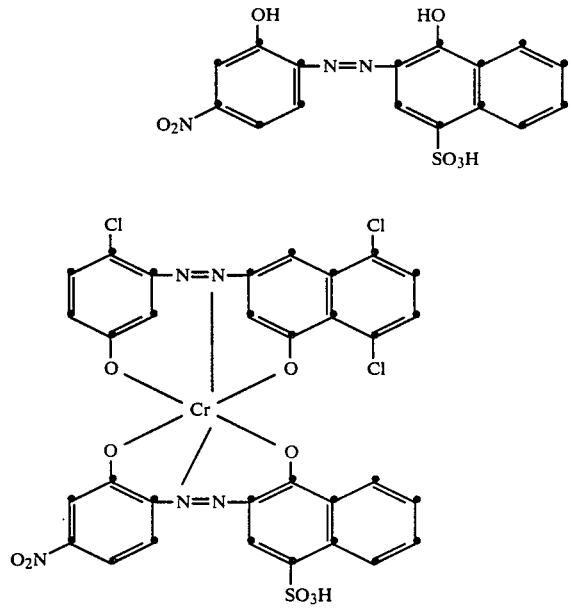

-continued

1:2 chromium mixed complex

1:2 cobalt complex

Dye of the formula (48)
Dye of the formula (49).

EXAMPLE 2

A nylon 6 or 66 velour or loop pile floor covering material which has a weight of 350 to 1200 g/m² is impregnated on a padder with a padding liquor which consists of (a) 0.7 part of a dye of the formula (12) as 1:2 cobalt complex, (b) 0.7 part of a mixture consisting of 15 parts of a dye of the formula (48), in the form of a 1:2 cobalt complex and 85 parts of a dye of the formula (49), (c) 972.6 parts of water, (d) 25 parts of a guar flour derivative, 4%, (e) 0.5 part of a coacervating agent, and (f) 0.5 part of an antifoam, and which has been adjusted to pH 7 with acetic acid. The impregnated goods are pinched off to a pick-up of about 100%.

A printing paste of the following composition is applied to the pretreated carpet material (g) 2 parts of a dye of the formula

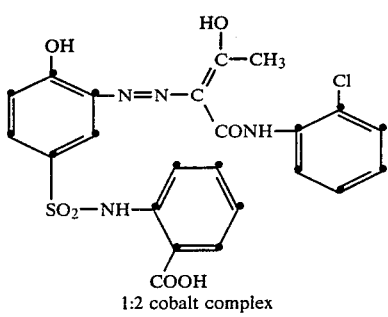

1:2 cobalt complex (h) 2 parts of a mixture as under (b) above,
(i) 492 parts of water,
(j) 500 parts of a guar flour derivative, 4%;
(k) 3 parts of a coacervating agent, and
(l) 1 part of an antifoam,
adjusted to pH 3.5 with citric acid.

The goods are steamed for 2 minutes with saturated steam of 101° C., then rinsed and dried. A uniformly and completely fixed green printed pattern is obtained on a uniformly and completely fixed olive ground.

Similar results are obtained by the above described method of pad-dyeing and printing with all dyes listed in Example 1 or with mixtures thereof.

EXAMPLE 3

A flat- or circular-knit nylon 6 or 66 carpet yarn is impregnated on a padder with a padding liquor which contains
(a) 0.7 part of the dye of the formula (40)
(b) 0.7 part of a mixture as in Example 1 (c),
(c) 931.1 parts of water,
(d) 75 parts of guar flour derivative, 4%,
(e) 1.5 parts of a coacervating agent, and
(f) 1 part of an antifoam,
and which has been adjusted to pH 7 with acetic acid. The impregnated goods are pinched off to a pick-up of about 100%. The pretreated knitted fabric is overprinted on both sides in a space-dyeing machine with a print paste which consists of
(g) 2 parts of a dye of the formula (40),
(h) 2 parts of a mixture as in (b) above,
(i) 845 parts of water,
(j) 150 parts of a guar flour derivative, 4%, and
(k) 1 part of an antifoam,
and which has been adjusted to pH 3.5 with citric acid.

The predyed and overprinted yarn knit is steamed for 2 minutes in saturated steam at 101° C., then rinsed, dried, and deknitted. A carpet yarn is obtained which has a space-dyed effect of levelly and completely fixed dark blue printed areas on a level pale blue ground.

EXAMPLE 4

A nylon 6 or 66 velour floor-covering is prewetted on a jet bulker or padder with a liquor consisting of
(a) 1 part of a synthetic detergent and
(b) 999 parts of water,
such that a residual moisture content of 100% remains.

The pretreated goods are impregnated on a dye applicator with a dyeing liquor which consists of
(c) 2 parts of a dye of the formula (11),
(d) 0.5 parts of a dye of the formula (32),
(e) 0.3 parts of a mixture as in Eample 2 (b),
(f) 3 parts of a guar flour derivative,
(g) 1.5 parts of a coacervating agent,
(h) 1.5 parts of a levelling agent,
(i) 1.5 parts of ammonium acetate,
(j) X parts of 80% acetic acid until pH 5.5 has been reached, and
(k) 989.7−X parts of water.

The liquor pick-up is 400 to 500%.

After the dye has been applied, the carpet is steamed for 2 minutes with saturated steam at 101° C., then rinsed and dried.

The medium brown level dying obtained on the carpet has fastness properties which meet the requirements of the automotive industry.

EXAMPLE 5

A nylon 6 or 66 velour floor-covering is prewetted on a jet bulker or pad-mangle with a liquor consisting of
(a) 1 part of a wetting agent, and
(b) 999 parts of water,
such that a residual moisture content of 60% remains.

The pretreated carpet goods are impregnated to a pick-up of 180% with a foamed dyeing liquor which consists of
(c) 1 part of a dye of the formula (12),
(d) 0.25 part of a dye of the formula (32),
(e) 0.15 part of a mixture as in Example (2b),
(f) 1 part of a foaming agent,
(g) 1 part of a foam regulator,
(h) X parts of a monosodium/disodium phosphate until pH 7 has been reached, and
(i) 996.9−X parts of water,
and has a blow ratio of 8:1. The goods are then steamed for 2 minutes in saturated steam at 101° C., and finally rinsed and dried.

The carpet is dyed in a uniform and level beige shade with fastness properties which met the requirements set by the automotive industry.

EXAMPLE 6

A piece of nylon 6 or 66 velour or loop pile floor-covering material which has a weight of 350 to 1200 g/m² is printed with a paste which contains
(a) 0.3 part of the dye of the formula

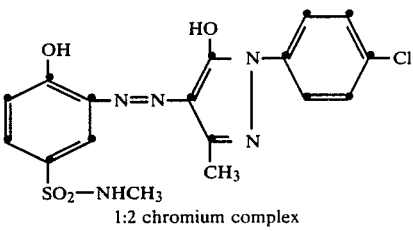

1:2 chromium complex (b) 0.2 part of the dye of the formula

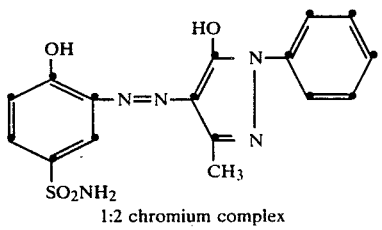

1:2 chromium complex (c) 1.0 part of the dye of the formula

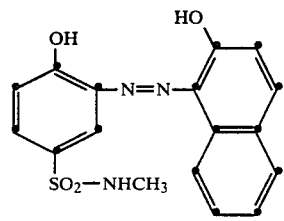

1:2 cobalt complex (d) 0.1 part of a dye obtained by cobalting the following dyes to give the 1:2 cobalt complex

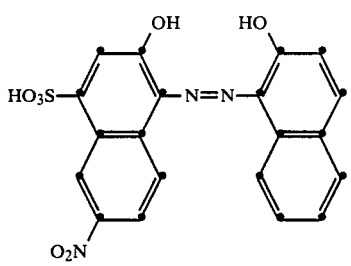

and

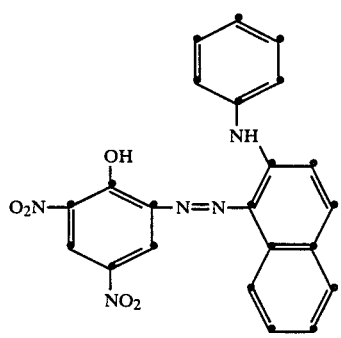

(e) 494.4 parts of water,
(f) 500 parts of a guar flour derivative, 4%,
(g) 3 parts of a coacervating agent, and
(h) 1 part of an antifoam,
and which is adjusted to pH 3.5 with formic acid.

The printed goods are steamed for 2 minutes with saturated steam at 101° C., and then rinsed and dried.

A levelly and completely fixed bordeaux print with sharp contours and good fastness properties is obtained.

Similar results are obtained with the following dyes or with mixtures thereof:

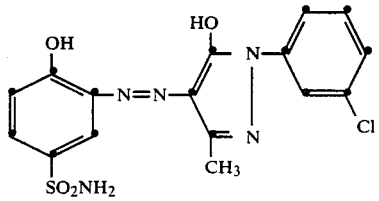

1:2 cobalt complex

-continued

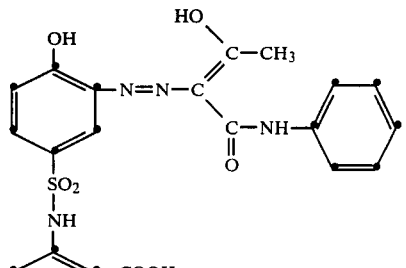

1:2 cobalt complex

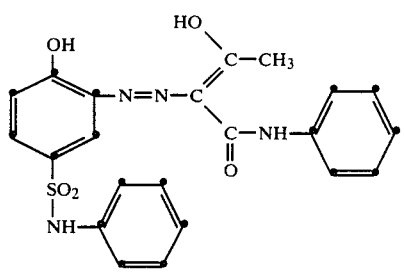

1:2 cobalt complex

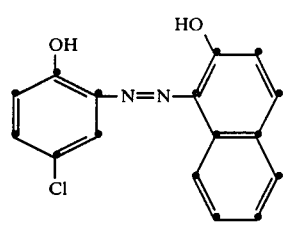

1:2 cobalt complex

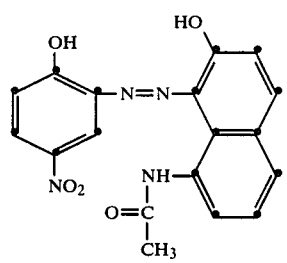

1:2 chromium complex

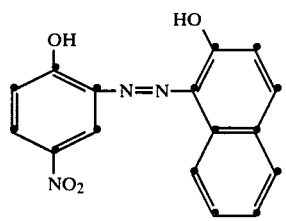

1:2 chromium complex.

EXAMPLE 7

A nylon 6 or 66 velour or loop pile floor-covering material which has a weight of 350 to 1200 g/m² is impregnated on a padder with a padding liquor which consists of (a) 0.7 parts of the dye of the formula

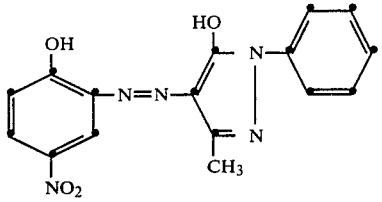

1:2 chromium complex (b) 0.7 part of a mixture consisting of 15 parts of a dye of the formula (48) as 1:2 cobalt complex, and 85 parts of a dye of the formula (49),
(c) 972.6 parts of water,
(d) 25 parts of a guar flour derivative, 4%,
(e) 0.5 part of a coacervating agent, and
(f) 0.5 part of an antifoam,
and which has been adjusted to pH 7 with acetic acid. The impregnated goods are pinched off to a liquor pick-up of about 100%.

A printing paste of the following composition is applied to the pretreated carpet material:

(g) 2 parts of a dye of the formula

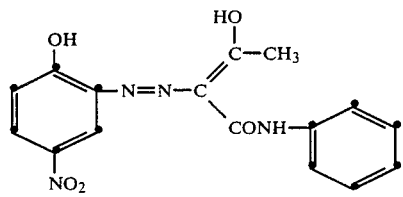

1:2 cobalt complex (h) 2 parts of a mixture as in (b) above,
(i) 492 parts of water,
(j) 500 parts of a guar flour derivative, 4%,
(k) 3 parts of a coacervating agent, and
(l) 1 part of an antifoam,
adjusted to pH 3.5 with citric acid.

The goods are steamed for 2 minutes with saturated steam at 101° C., then rinsed, and dried. A uniformly and completely fixed green printed pattern is obtained on a uniformly and completely fixed bordeaux ground.

Similar results are obtained by using the above described pad-dyeing and printing method with the following dyes or mixtures thereof:

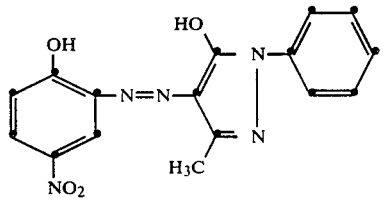

1:2 cobalt complex

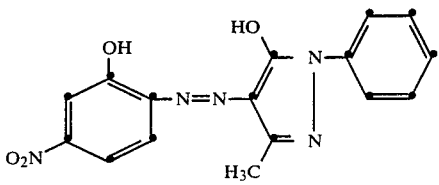

1:2 cobalt complex

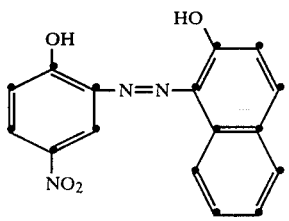

1:2 cobalt complex

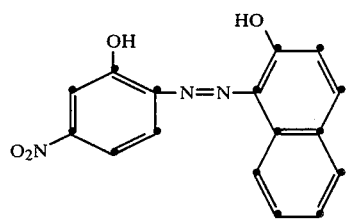

1:2 cobalt complex

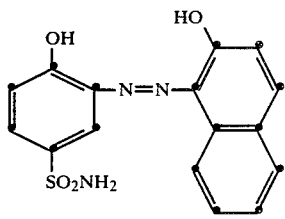

1:2 chromium complex

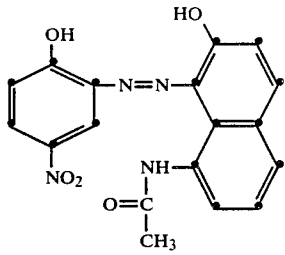

1:2 chromium complex

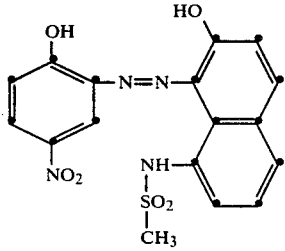

1:2 chromium complex.

EXAMPLE 8

A flat- or circular-knit nylon 6 or 66 carpet yarn is impregnated on a padder with a padding liquor which contains
(a) 0.7 part of the dye of the formula (40),
(b) 0.7 part of the dye of the formula

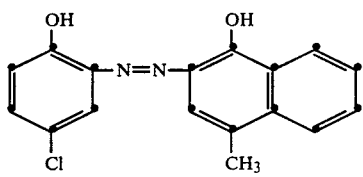

1:2 chromium complex (c) 931.1 parts of water,
(d) 75 parts of a guar flour derivative, 4%,
(e) 1.5 parts of a coacervating agent, and
(f) 1 part of an antifoam,
and which has been adjusted to pH 7 with acetic acid. The impregnated goods are pinched off to a liquor pick-up of about 100%. The pretreated knit is printed on both sides in a space-dyeing machine with a printing paste which consists of
(g) 2 parts of a dye of the formula (40),
(h) 2 parts of the dye as in (b) above,
(i) 845 parts of water,
(j) 150 parts of a guar flour derivative, 4%, and
(k) 1 part of an antifoam,
and which has been adjusted to pH 3.5 with citric acid.

The predyed and overprinted yarn knit is steamed for 2 minutes in saturated steam at 101° C., then rinsed, dried, and deknitted. A space-dyed effect of uniformly and completely fixed dark blue printed areas on top of a level pale blue ground is obtained on the carpet yarn.

Similar results are obtained with the space-dyeing method described above but using the following dyes or mixtures thereof:

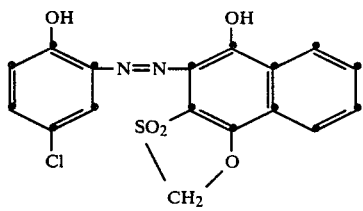

1:2 chromium complex

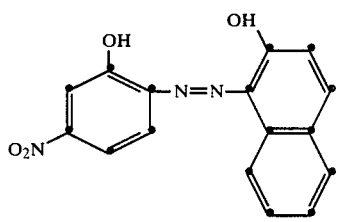

1:2 chromium complex

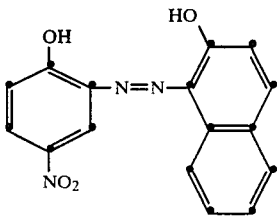

1:2 chromium complex

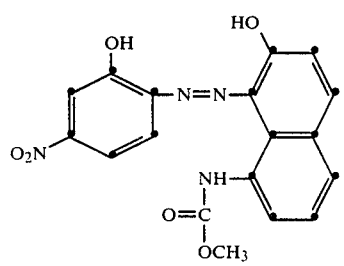

1:2 chromium complex.

EXAMPLE 9

A nylon 6 or 66 velour floor-covering is prewetted on a jet bulker or padder with a liquor consisting of
(a) 1 part or a synthetic detergent and
(b) 999 parts of water,
such that a residual moisture content of 100% remains.

The pretreated goods are impregnated on a dye applicator with a dyeing liquor which consists of
(c) 2 parts of the dye of the formula (12),
(d) 0.5 part of the dye of the formula

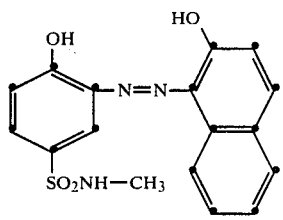

1:2 cobalt complex (e) 0.3 part of a mixture as in Example (2b),
(f) 3 parts of a guar flour derivative,
(g) 1.5 parts of a coacervating agent,
(h) 1.5 parts of a levelling agent,
(i) 1.5 parts of ammonium acetate,
(j) X parts of 80% acetic acid until pH 5.5 has been reached, and
(k) 989.7−X parts of water.
The liquor pick-up is 400 to 500%.

After the dye has been applied, the carpet is steamed for 2 minutes with saturated steam at 101° C., then rinsed and dried.

The medium brown dyeing obtained on the carpet has a uniform, level shade and fastness properties which meet the requirements set by the automotive industry.

Similar results are obtained with the continuous method described above by using the following dyes or mixtures thereof:

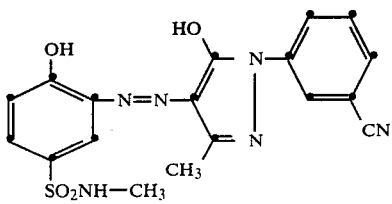

1:2 chromium complex

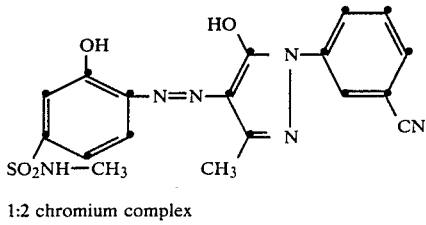

1:2 chromium complex

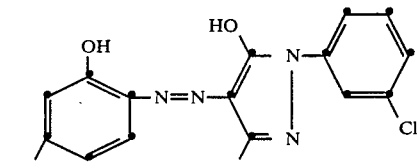

1:2 chromium complex

EXAMPLE 10

A nylon 6 or 66 velour floor-covering is prewetted on a jet bulker or padder with a liquor consisting of
(a) 1 part of a synthetic detergent and
(b) 999 parts of water,
such that a residual moisture content of 100% remains.

The pretreated goods are impregnated on a dye applicator with a dyeing liquor which consists of
(c) 1.5 parts of a dye of the formula (11),
(d) 1 part of a dye of the formula (19),
(e) 0.5 part or a dye of the formula (40),
(f) 3 parts of a guar flour derivative,
(g) 1.5 parts of a coacervating agent,
(h) 1.5 parts of a levelling agent,
(i) 1.5 parts of ammonium acetate,
(j) X parts of 80% acetic acid until pH 5.5 has been reached, and
(k) 989.7−X parts of water.

The liquor pick-up is 400 to 500%.

After the dye has been applied, the carpet is steamed for 2 minutes with saturated steam at 101° C., then rinsed and dried.

The medium brown dyeing obtained on the floor covering has a uniform, level shade and fastness properties which meet the requirements set by the automotive industry.

EXAMPLE 11

A nylon 6 or 66 velour floor-covering is prewetted on a jet bulker or padder with a liquor consisting of
(a) 1 part of a synthetic detergent and
(b) 999 parts of water,
such that a residual moisture content of 100% remains.

The pretreated goods are impregnated on a dye applicator with a dye liquor which consists of
(c) 1.5 parts of a dye of the formula (12)
(d) 1 part of a dye of the formula (19),
(e) 0.5 part of a mixture of equal parts of the dyes

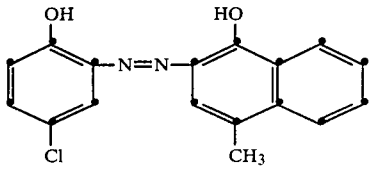

1:2 chromium complex

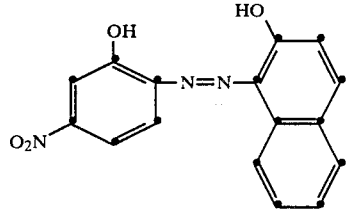

1:2 chromium complex (f) 3 parts of a guar flour derivative
(g) 1.5 parts of a coacervating agent,
(h) 1.5 parts of a levelling agent,
(i) 1.5 parts of ammonium acetate,
(j) X parts of 80% acetic acid until pH 5.5 has been reached, and
(k) 989.7−X parts water.

The liquor pick-up is 400 to 500%.

After the dye has been applied, the carpet is steamed for 2 minutes with saturated steam at 101° C., then rinsed and dried.

The brown dyeing obtained has a uniform, level shade and fastness properties which meet the requirements set by the automotive industry.

EXAMPLE 12

A nylon 6 or 66 velour floor-covering is prewetted on a jet bulker or padder with a liquor consisting of
(a) 1 part of a wetting agent, and
(b) 999 parts of water,
such that a residual moisture content of 60% remains.

The pretreated carpet goods are impregnated to a pick-up of 180% with a foamed dye liquor which consists of
(c) 1 part of a dye of the formula (11),
(d) 0.3 part of a dye of the formula (19),
(e) 0.15 part of a mixture as in Example 2(b),
(f) 1 part of a foaming agent,
(g) 1 part of a foam regulator,
(h) X parts of monosodium/disodium phosphate until pH 7 has been reached, and
(i) 996.9−X parts of water,
and has a blow ratio of 8:1. The goods are then steamed for 2 minutes in saturated steam at 101° C., and finally rinsed and dried.

The carpet is dyed in a uniform and level beige shade with fastness properties which meet the requirements set by the automotive industry.

EXAMPLE 13

A nylon 6 or 66 velour floor-covering is prewetted on a jet bulker or padder with a liquor consisting of
(a) 1 part of a wetting agent, and
(b) 999 parts of water,
such that a residual moisture content of 60% remains.

The pretreated carpet goods are impregnated to a pick-up of 180% with a foamed dyeing liquor which consists of
(c) 1 part of a dyestuff of the formula (12),
(d) 0.25 part of a dye of the formula

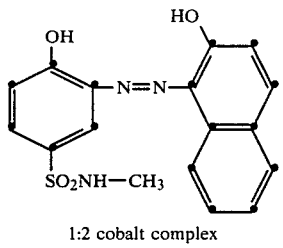

1:2 cobalt complex (e) 0.15 part of a mixture of the dye of the formulae

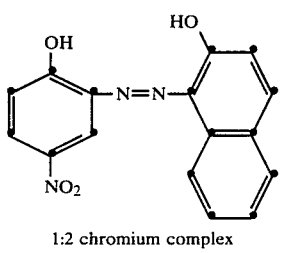

1:2 chromium complex and

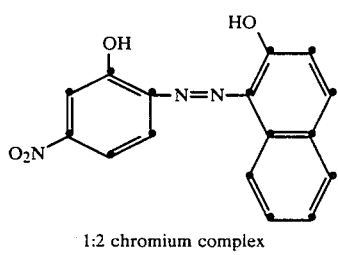

1:2 chromium complex (f) 1 part of a foaming agent,
(g) 1 part of a foam regulator,
(h) X parts of monosodium/disodium phosphate until pH 7 has been reached, and
(i) 996.9−X parts of water,
and has a blow ratio of 8:1. The goods are then steamed for 2 minutes in saturated steam at 101° C., and finally rinsed and dried.

The carpet is dyed in a uniform and level beige shade with fastness properties which meet the requirements set by the automotive industry.

EXAMPLE 14

A nylon 6 or 66 velour floor-covering is impregnated, without having been prewetted, to a pick-up of 80% with a foamed dye liquor which consists of
(a) 2 parts of a dye of the formula (12),
(b) 0.5 part of a dye of the formula (32),
(c) 0.3 part of a mixture as in Example 2(b),
(d) 6 parts of a foaming agent,
(e) 4 parts of a foam stabiliser,
(f) 1 part of a foam regulator,
(g) X parts of monosodium/disodium phosphate until pH 7 has been reached and
(h) 986.2−X parts of water and which has a blow ratio of 20:1. The goods are then steamed for 2 minutes in saturated steam at 101° C., and finally rinsed and dried.

The carpet is dyed in a uniform and level beige shade with fastness properties which meet the requirements set by the automotive industry.

EXAMPLE 15

A nylon 6 or 66 velour or loop pile floor-covering material which has a weight of 350 to 1200 g/m² is printed with a paste which contains
(a) 0.5 part of a dye of the formula (13) as 1:2 cobalt complex,
(b) 1 part of a dye of the formula (33)
(c) 0.1 part of a dye of the formula (49),
(d) 0.03 part of the dye of the formula (48),
(e) 494.4 parts of water,
(f) 500 parts of a guar flour derivative, 4%,
(g) 3 parts of a coacervating agent, and
(h) 1 part of an antifoam,
and has been adjusted to a pH of 3.5 with citric acid.

The printed goods are steamed for 2 minutes with saturated steam at 101° C., then rinsed and dried, to give a uniformly and completely fixed bordeaux print with sharp contours and good fastness properties.

EXAMPLE 16

A nylon 6 or 66 velour or loop pile floor covering material which has a weight of 350 to 1200 g/m² is impregnated on a padder with a padding liquor which consists of
(a) 0.7 part of a dye of the formula (14) as 1:2 cobalt complex,
(b) 0.7 part of a mixture consisting of 15 parts of a dye of the formula (48), in the form of a 1:2 cobalt complex and 85 parts of a dye of the formula (49),
(c) 972.6 parts of water,
(d) 25 parts of a guar flour derivative, 4%,
(e) 0.5 part of a coacervating agent, and
(f) 0.5 part of a n antifoam,
and which has been adjusted to pH 7 with acetic acid. The impreganted goods are pinched off to a pick-up of about 100%.

A printing paste of the following composition is applied to the pretreated carpet material
(g) 2 parts of a dye of the formula

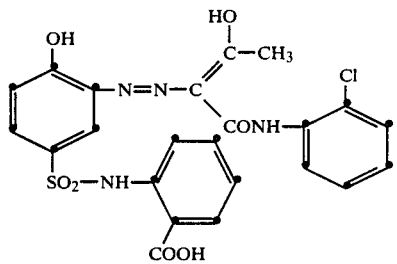

1:2 cobalt complex (h) 2 parts of a mixture as under (b) above,
(i) 492 parts of water,
(j) 500 parts of a guar flour derivative, 4%;
(k) 3 parts of a coacervating agent, and
(l) 1 part of an antifoam,
adjusted to pH 3.5 with citric acid.

The goods are steamed for 2 minutes with saturated steam at 101° C., then rinsed and dried. A uniformly and completely fixed green printed pattern is obtained on a uniformly and completely fixed olive ground.

EXAMPLE 17

A flat- or circular-knit nylon 6 or 66 carpet yarn is impregnated on a padder with a padding liquor which contains
(a) 0.7 part of the dye of the formula (42)
(b) 0.7 part of a dye of the formula (49),
(c) 931.1 parts of water,
(d) 75 parts of guar flour derivative, 4%,
(e) 1.5 parts of a coacervating agent, and
(f) 1 part of an antifoam,
and which has been adjusted to pH 7 with acetic acid. The impregnated goods are pinched off to a pick-up of about 100%. The pretreated knitted fabric is overprinted on both sides in a space-dyeing machine with a print paste which consists of
(g) 2 parts of a dye of the formula (42),
(h) 2 parts of a dye of the formula (49),
(i) 845 parts of water,
(j) 150 parts of a guar flour derivative, 4%, and
(k) 1 part of an antifoam,
and which has been adjusted to pH 3.5 with citric acid.

The predyed and overprinted yarn knit is steamed for 2 minutes in saturated steam at 101° C., then rinsed, dried, and deknitted. A carpet yarn is obtained which has a space-dyed effect of levelly and completely fixed dark blue printed areas on a level pale blue ground.

EXAMPLE 18

A nylon 6 or 66 velour floor-covering is prewetted on a jet bulker or padder with a liquor consisting of
(a) 1 part of a synthetic detergent and
(b) 999 parts of water,
such that a residual moisture content of 100% remains.

The pretreated goods are impregnated on a dye applicator with a deying liquor which consists of
(c) 2 parts of a dye of the formula (15),
(d) 0.5 parts of a dye of the formula (34),
(e) 0.3 parts of a mixture as in Example 2(b),
(f) 3 parts of a guar flour derivative,
(g) 1.5 parts of a coacervating agent,
(h) 1.5 parts of a levelling agent,
(i) 1.5 parts of ammonium acetate,
(j) X parts of 80% acetic acid until pH 5.5 has been reached, and
(k) 989.7−X parts of water.
The liquor pick-up is 400 to 500%.

After the dye has been applied, the carpet is steamed for 2 minutes with saturated steam at 101° C., then rinsed and dried.

The medium brown level dyeing obtained on the carpet has fastness properties which meet the requirements of the automotive industry.

EXAMPLE 19

A nylon 6 or 66 velour floor-covering is prewetted on a jet bulker or padder with a liquor consisting of
(a) 1 part of a wetting agent, and
(b) 999 parts of water,
such that a residual moisture content of 60% remains.

The pretreated carpet goods are impregnated to a pick-up of 180% with a foamed dyeing liquor which consists of
(c) 1 part of a dye of the formula (16),
(d) 0.25 part of a dye of the formula (33),
(e) 0.15 part of a mixture as in Example 2(b),
(f) 1 part of a foaming agent,
(g) 1 part of a foam regulator,
(h) X parts of monosodium/disodium phosphate until pH 7 has been reached, and
(i) 996.9−X parts of water,
and has a blow ratio of 8:1. The goods are then steamed for 2 minutes in saturated steam at 101° C., and finally rinsed and dried.

The carpet is dyed in a uniform and level beige shade with fastness properties which meet the requirements set by the automotive industry.

EXAMPLE 20

A piece of nylon 6 or 66 velour or loop pile floor-covering material which has a weight of 350 to 1200 g/m$^2$ is printed with a paste which contains
(a) 0.3 part of the dye of the formula (22)
(b) 0.2 part of the dye of the formula

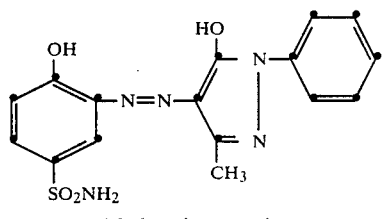

1:2 chromium complex (c) 1.0 part of the dye of the formula (34)

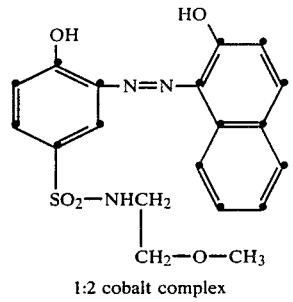

1:2 cobalt complex (d) 0.1 part of a dye obtained by cobalting the following dyes to give the 1:2 cobalt complex

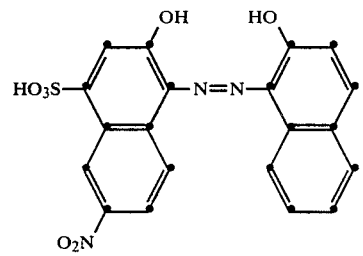

and

-continued

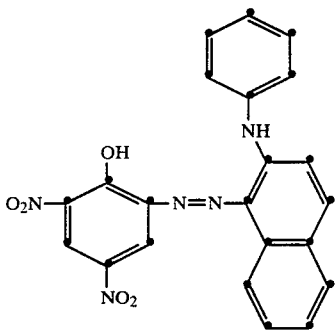

(e) 494.4 parts of water,
(f) 500 parts of a guar flour derivative, 4%,
(g) 3 parts of a coacervating agent, and
(h) 1 part of an antifoam,
and which is adjusted to pH 3.5 with formic acid.

The printed goods are steamed for 2 minutes with saturated steam at 101° C., and then rinsed and dried.

A levelly and completely fixed bordeaux print with sharp contours and good fastness properties is obtained.

EXAMPLE 21

A nylon 6 or 66 velour or loop pile floor-covering material which has a weight of 350 to 1200 g/m² is impregnated on a padder with a padding liquor which consists of
(a) 0.7 part of the dye of the formula (24)

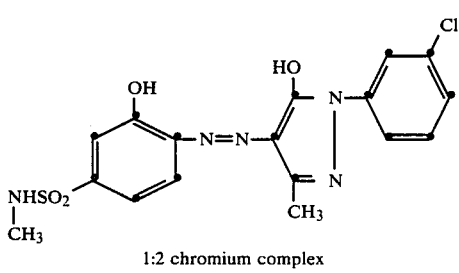

1:2 chromium complex (b) 0.7 part of a mixture consisting of 15 parts of a dye of the formula (48) as 1:2 cobalt complex, and 85 parts of a dye of the formula (49),
(c) 972.6 parts of water,
(d) 25 L parts of a guar flour derivative, 4%,
(e) 0.5 part of a coacervating agent, and
(f) 0.5 part of an antifoam,
and which has been adjusted to pH 7 with acetic acid. The impregnated goods are pinched off to a liquor pick-up of about 100%.

A printing paste of the following composition is applied to the pretreated carpet material:
(g) 2 parts of a dye of the formula (15)

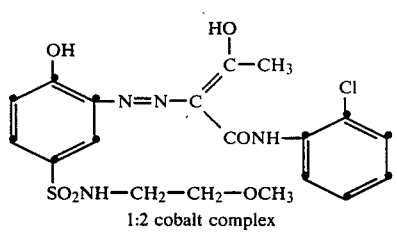

1:2 cobalt complex (h) 2 parts of the dye of the formula (38),
(i) 492 parts of water,
(j) 500 parts of a guar flour derivative, 4%,
(k) 3 parts of a coacervating agent, and
(l) 1 part of an antifoam,
adjusted to pH 3.5 with citric acid.

The goods are steamed for 2 minutes with saturated steam at 101° C., then rinsed, and dried. A uniformly and completely fixed green printed pattern is obtained on a uniformly and completely fixed bordeaux ground.

EXAMPLE 22

A flat- or circular-knit nylon 6 or 66 carpet yarn is impregnated on a padder with a padding liquor which contains
(a) 0.7 part of the dye of the formula (43),
(b) 0.7 part of the dye of the formula (37),

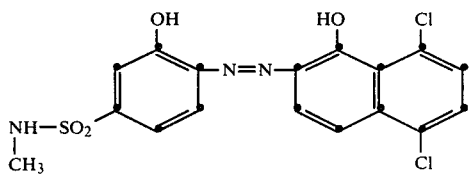

1:2 chromium complex (c) 931.1 parts of water,
(d) 75 parts of a guar flour derivative, 4%,
(e) 1.5 parts of a coacervating agent, and
(f) 1 part of an antifoam,
and which has been adjusted to pH 7 with acetic acid. The impregnated goods are pinched off to a liquor pick-up of about 100%. The pretreated knit is printed on both sides in a space-dyeing machine with a printing paste which consists of
(g) 2 parts of a dye of the formula (41),
(h) 2 parts of the dye of the formula (36),
(i) 845 parts of water,
(j) 150 parts of a guar flour derivative, 4%, and
(k) 1 part of an antifoam,
and which has been adjusted to pH 3.5 with citric acid.

The predyed and overprinted yarn knit is steamed for 2 minutes in saturated steam at 101° C., then rinsed, dried, and deknitted. A space-dyed effect of uniformly and completely fixed dark blue printed areas on top of a level pale blue ground is obtained on the carpet yarn.

EXAMPLE 23

A nylon 6 or 66 velour floor-covering is prewetted on a jet bulker or pad-mangle with a liquor consisting of P0
(a) 1 part or a synthetic detergent and
(b) 999 parts of water,
such that a residual moisture content of 100% remains.

The pretreated goods are impregnated on a dye applicator with a dyeing liquor which consists of
(c) 2 parts of the dye of the formula (16),
(d) 0.5 part of the dye of the formula (26),
(e) 0.3 part of a mixture as in Example 2(b),
(f) 3 parts of a guar flour derivative,
(g) 1.5 parts of a coacervating agent,
(h) 1.5 parts of a levelling agent,
(i) 1.5 parts of ammonium acetate,
(j) X parts of 80% acetic acid until pH 5.5 has been reached, and
(k) 989.7−X parts of water.
The liquor pick-up is 400 to 500%.

After the dye has been applied, the carpet is steamed for 2 minutes with saturated steam at 101° C., then rinsed, and dried.

The medium brown dyeing obtained on the carpet has a uniform, level shade and fastness properties which meet the requirements set by the automotive industry.

EXAMPLE 24

A nylon 6 or 66 velour floor-covering is prewetted on a jet bulker or padder with a liquor consisting of
(a) 1 part of a synthetic detergent and
(b) 999 parts of water,
such that a residual moisture content of 100% remains.

The pretreated goods are impregnated on a dye applicator with a dyeing liquor which consists of
(c) 1.5 parts of a dye of the formula (13),
(d) 1 part of a dye of the formula (23),
(e) 0.5 part or a dye of the formula (42),
(f) 3 parts of a guar flour derivative,
(g) 1.5 parts of a coacervating agent,
(h) 1.5 parts of a levelling agent,
(i) 1.5 parts of ammonium acetate,
(j) X parts of 80% acetic acid until pH 5.5 has been reached, and
(k) 989.7 − X parts of water.
The liquor pick-up is 400 to 500%.

After the dye has been applied, the carpet is steamed for 2 minutes with saturated steam at 101° C., then rinsed, and dried.

The medium brown dyeing obtained on the floor covering has a uniform, level shade and fastness properties which meet the requirements set by the automotive industry.

EXAMPLE 25

A nylon 6 or 66 velour floor-covering is prewetted on a jet bulker or pad-mangle with a liquor consisting of
(a) 1 part of a synthetic detergent and
(b) 999 parts of water,
such that a residual moisture content of 100% remains.

The pretreated goods are impregnated on a dye applicator with a dye liquor which consists of
(c) 1.5 parts of a dye of the formula (18),
(d) 1 part of a dye of the formula (30),
(e) 0.5 part of a mixture of equal parts of the dye of the formula

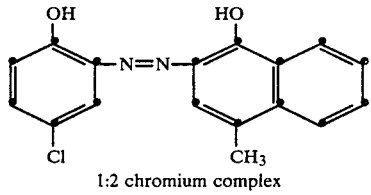

1:2 chromium complex and the dye of the formula (38),
(f) 3 parts of a guar flour derivative
(g) 1.5 parts of a coacervating agent,
(h) 1.5 parts of a levelling agent,
(i) 1.5 parts of ammonium acetate,
(j) X parts of 80% acetic acid until pH 5.5 has been reached, and
(k) 989.7 − X parts of water.
The liquor pick-up is 400 to 500%.

After the dye has been applied, the carpet is steamed for 2 minutes with saturated steam at 101° C., then rinsed, and dried.

A brown dyeing obtained has a uniform, level shade and fastness properties which meet the requirements set by the automotive industry.

EXAMPLE 26

A nylon 6 or 66 velour floor-covering is prewetted on a jet bulker or padder with a liquor consisting of
(a) 1 part of a wetting agent, and
(b) 999 parts of water,
such that a residual moisture content of 60% remains.

The pretreated carpet goods are impregnated to a pick-up of 180% with a foamed dye liquor which consists of
(c) 1 part of a dye of the formula (18),
(d) 0.3 part of a dye of the formula (19),
(e) 0.15 part of a mixture as in Example 2(b),
(f) 1 part of a foaming agent,
(g) 1 part of a foam regulator,
(h) X parts of monosodium/disodium phosphate until pH 7 has been reached, and
(i) 996.9 − X parts of water,
and has a blow ratio of 8:1. The goods are then steamed for 2 minutes in saturated steam at 101° C., and finally rinsed and dried.

The carpet is dyed in a uniform and level beige shade with fastness properties which meet the requirements set by the automotive industry.

EXAMPLE 27

A nylon 6 or 66 velour floor-covering is prewetted on a jet bulker or pad-mangle with a liquor consisting of
(a) 1 part of a wetting agent, and
(b) 999 parts of water,
such that a residual moisture content of 60% remains.

The pretreated carpet goods are impregnated to a pick-up of 180% with a foamed dyeing liquor which consists of
(c) 1 part of a dyestuff of the formula (31),
(d) 0.25 part of a dye of the formula (33),
(e) 0.15 part of a mixture of the dye of the formulae

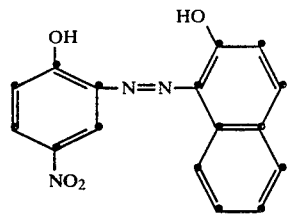

1:2 chromium complex and

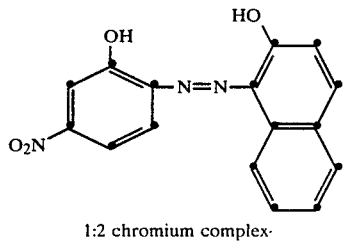

1:2 chromium complex (f) 1 part of a foaming agent,
(g) 1 part of a foam regulator,
(h) X parts of monosodium/disodium phosphate until pH 7 has been reached, and (i) 996.9—X parts of water,
and has a blow ratio of 8:1. The goods are then steamed for 2 minutes in saturated steam at 101° C., and finally rinsed and dried.

The carpet is dyed in a uniform and level beige shade with fastness properties which meet the requirements set by the automotive industry.

EXAMPLE 28

A nylon 6 or 66 velour floor-covering is impregnated, without having been prewetted, to a pick-up of 80% with a foamed dye liquor which consists of
(a) 2 parts of a dye of the formula (13),
(b) 0.5 part of a dye of the formula (33),
(c) 0.25 part of a dye of the formula (34),
(d) 0.3 part of a mixture as in Example (2b),
(e) 6 parts of a foaming agent,
(f) 4 parts of a foam stabiliser,
(g) 1 part of a foam regulator,
(h) X parts of monosodium/disodium phosphate until pH 7 has been reached and
(i) 986.2—X parts of water
and which has a blow ratio of 20:1. The goods are then steamed for 2 minutes in saturated steam at 101° C., and finally rinsed and dried.

The carpet is dyed in a uniform and level beige shade with fastness properties which meet the requirements set by the automotive industry.

What is claimed is:

1. A process for dyeing or printing synthetic polyamide fibres by a rapid fixation method, which process comprises dyeing or printing synthetic polyamide fibers with a dye or a mixture of dyes selected from the dyes of the formulae

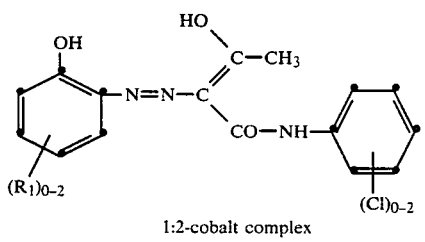

1:2-cobalt complex wherein $(R_1)_{0-2}$ represents 0 to 2 substituents $R_1$ which may each independently be $C_1-C_4$alkyl, $C_1-C_4$alkoxy, halogen, nitro, sulfamoyl, N—$C_1-C_4$alkylsulfamoyl, N—$C_1-C_2$alkoxy-$C_1-C_2$alkylsulfamoyl, phenylaminosulfonyl, carboxyphenylamoinosulfonyl, $C_1-C_4$alkylsulfonyl or acetylamino;

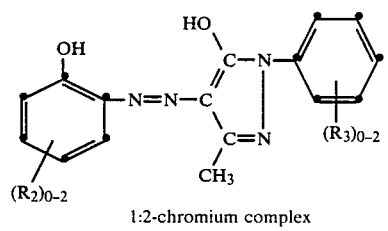

1:2-chromium complex wherein $(R_2)_{0-2}$ represents 0 to 2 substituents $R_2$ which may each independently be $C_1-C_4$alkyl, $C_1-C_4$alkoxy, halogen, nitro, sulfamoyl, N—$C_1-C_4$alkylsulfamoyl, N—$C_1-C_2$alkoxy-$C_1-C_3$alkylsulfamoyl, phenylaminosulfonyl, carboxyphenylaminosulfonyl, $C_1-C_4$alkylsulfonyl or acetylamino, and $(R_3)_{0-2}$ represents 0 to 2 substituents $R_3$ which may each independently be halogen, $C_1-C_4$alkyl, cyano or sulfamoyl; 1:2 cobalt complex of the dyes of the formula (2), wherein $R_2$ has the same meaning as in the 1:2 chromium complexes and $(R_3)_{0-2}$ represents 0 to 2 substituents $R_3$ which may each independently be halogen, cyano or sulfamoyl;

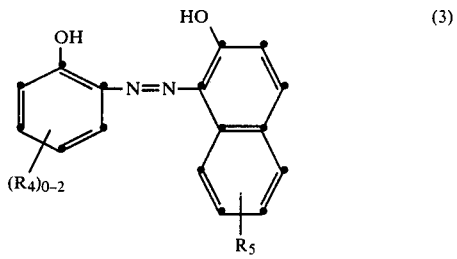

1:2-cobalt or 1:2 chromium complex wherein $R_4$ has the same meaning as $R_1$ in formula (1), and $R_5$ is hydrogen, acetylamino, methoxycarbonylamino or methylsulfonylamino;

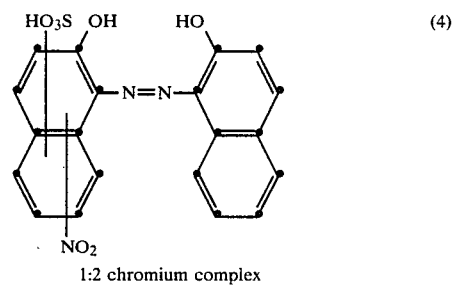

1:2 chromium complex

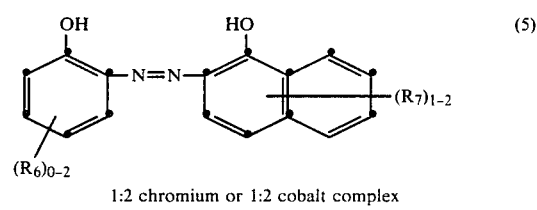

1:2 chromium or 1:2 cobalt complex wherein $R_6$ has the same meaning as $R_1$ in formula (1), and $(R_7)_{1-2}$ represents 1 to 2 substituents $R_7$ which may each independently be halogen, methyl, methoxy or sulfo, or wherein 2 adjacent substituents $R_7$ are able to form a closed bridge member —$SO_2$—$CH_2$—O—;

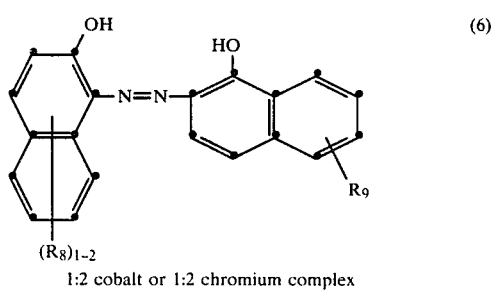

1:2 cobalt or 1:2 chromium complex wherein $(R_8)_{1-2}$ represents 1 to 2 substituents $R_8$ which may each independently be sulfo or nitro and $R_9$ is hydrogen or hydroxy;

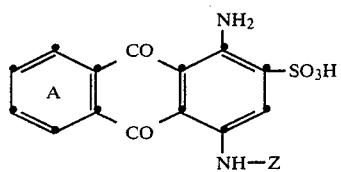 (7)

wherein Z is the radical of the formula

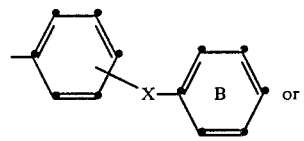 or

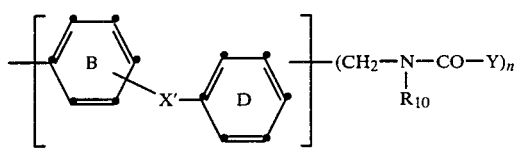

wherein X is the —O—SO$_2$—, —NH—SO$_2$ or —NH—CO— group and X' is oxygen or sulfur, R$_{10}$ is hydrogen or C$_1$–C$_4$alkyl, Y is an unsubstituted or substituted aryl radical, n is 1, 2 or 3, the benzene ring A may be substituted by halogen and the benzene rings B and D may each independently be substituted by halogen, C$_1$–C$_4$alkyl, C$_1$–C$_4$alkoxy or by a radical of the formula ─(O—CH$_2$CH$_2$─)O—R$_{11}$, wherein R$_{11}$ is hydrogen, methyl or ethyl;

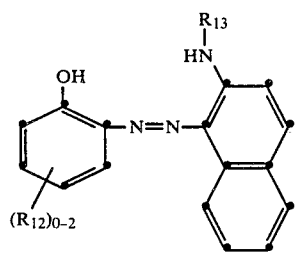 (8)

1:2 cobalt complex wherein R$_{12}$ has the same meaning as R$_1$ in formula (1), and R$_{13}$ is hydrogen or phenyl;

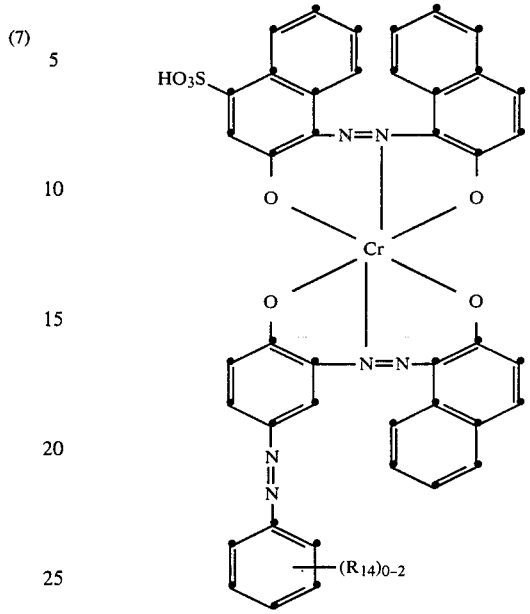 (9)

wherein (R$_{14}$)$_{0-2}$ represents 0 to 2 substituents R$_{14}$, which may each independently be C$_1$–C$_4$alkyl, C$_1$–C$_4$alkoxy, halogen, carboxy or sulfo; and a mixture of the 1:2-chromium complexes of formula (10), (10a) and (10b)

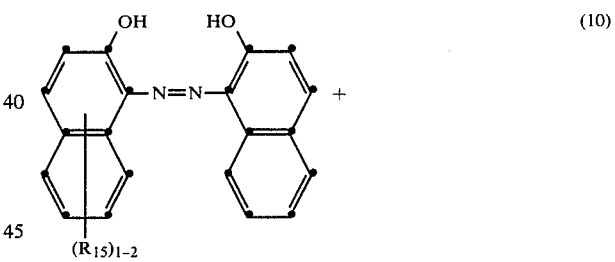 (10)

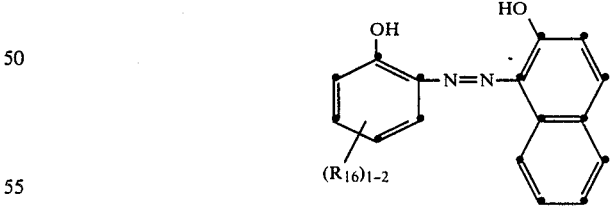

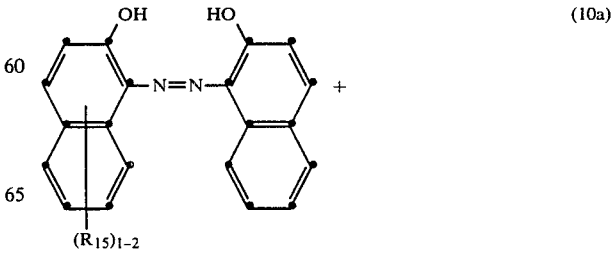 (10a)

-continued

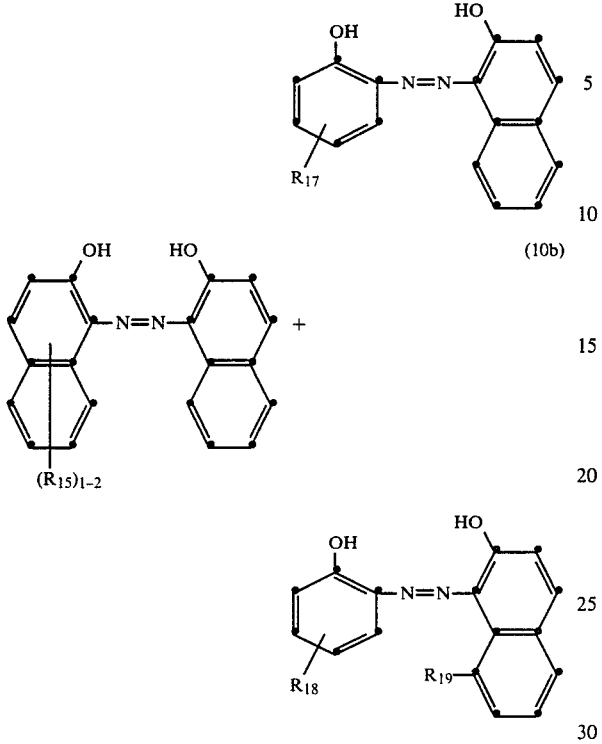

wherein $(R_{15})_{1-2}$ represents 1 to 2 substituents $R_{15}$, which may each independently be sulfo or nitro, $(R_{16})_{1-2}$ represents 1 to 2 substituents $R_{16}$, which may each independently be nitro, halogen, methyl or acetylamino, $R_{17}$ has the same meaning as $R_{16}$, independently thereof, $R_{18}$ has the same meaning as $R_{16}$, independently thereof, and $R_{19}$ is acetylamino, methoxycarbonylamino, ethoxycarbonylamino, methylsulfonylamino or N,N-dimethylaminosulfonyl; 1:2 cobalt mixed complexes of the dyes of the formulae (2) and (3) or (4) and (8); in a continuous dyeing process or printing method, and fixing the dyeings or prints by steaming for less than 3 minutes, during which time at least 95% fixation of the dyes is achieved.

2. A process according to claim 1, which comprises the use of dyes or mixtures of dyes of the formulae
(1) 1:2 cobalt complex, wherein $R_1$ is nitro, sulfamoyl, N-methylsulfamoyl, methylsulfonyl, carboxyphenylaminosulfonyl or N-(β-methoxyethyl)sulfamoyl;
(2) 1:2 chromium complex, wherein $R_2$ is chlorine, nitro, sulfamoyl or N-methylsulfamoyl, and $R_3$ is chlorine, methyl or sulfamoyl;
(2) 1:2 cobalt complex, wherein $R_2$ is chlorine, nitro, sulfamoyl or N-methylsulfamoyl, and $R_3$ is chlorine, cyano or sulfamoyl;
(3) 1:2 cobalt or 1:2 chromium complex, wherein $R_4$ is methyl, methoxy, chlorine, nitro, sulfo, sulfamoyl, N—$C_1$-$C_3$alkylsulfamoyl, N-β-methoxyethylsulfamoyl, phenylaminosulfonyl, methylsulfonyl or acetylamino, and $R_5$ is hydrogen, acetylamino, methoxycarbonylamino or methylsulfonylamino;
(4) 1:2 chromium complex;
(5) 1:2 chromium or 1:2 cobalt complex, wherein $R_6$ is nitro, chlorine, sulfamoyl, N-methylsulfamoyl or N-ethylsulfamoyl, and $R_7$ is chlorine, methyl, methoxy or sulfo, or wherein 2 adjacent substituents $R_7$ are able to form a closed bridge member —SO$_2$—CH$_2$—O—;
(6) 1:2 cobalt or 1:2 chromium complex, wherein $R_8$ is as defined in claim 1 and $R_9$ is hydrogen;
(7) wherein X is as defined in claim 1, the benzene ring A is unsubstituted and the benzene ring B can be substituted by methyl or methoxy, or wherein X' is oxygen, $R_{10}$ is hydrogen, Y is phenyl, and n is 1 or 2, the benzene ring A is unsubstituted and the benzene rings B and D can each independently be substituted by chlorine, methyl or methoxy.
(8) 1:2 cobalt complex, wherein $R_{12}$ is methoxy, chlorine, nitro, sulfo or sulfamoyl;
(9) wherein $R_{14}$ is methyl, methoxy, ethoxy, chlorine, carboxy or sulfo;
(10) 1:2 chromium mixed complex, wherein $R_{15}$ is as defined in claim 1, $R_{16}$, $R_{17}$ and $R_{18}$ are each independently nitro, chlorine, methyl or acetylamino, and $R_{19}$ is as defined in claim 1; or
1:2 cobalt mixed complexes of dyes of the formulae (2) and (3) or (4) and (8).

3. A process according to claim 2, which comprises the use of dyes or mixtures of dyes of the formulae

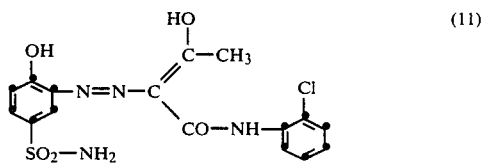

1:2 cobalt complex

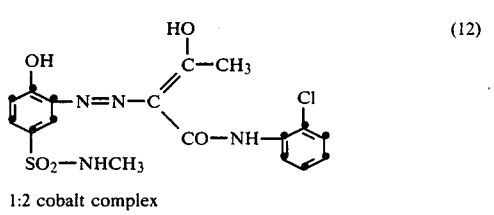

1:2 cobalt complex

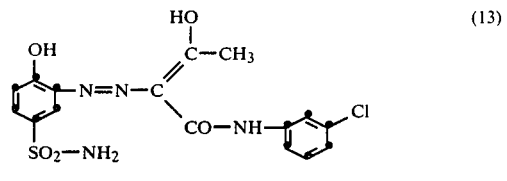

1:2 cobalt complex

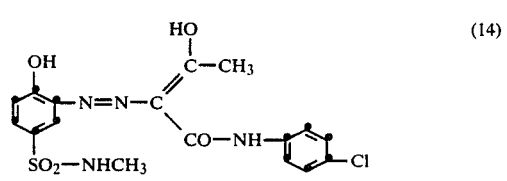

1:2 cobalt complex

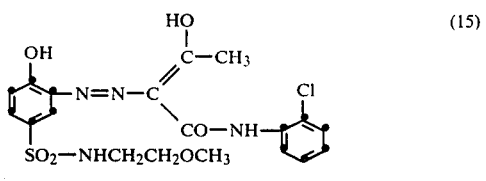

1:2 cobalt complex

-continued
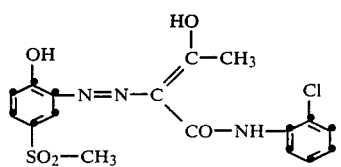
1:2 cobalt complex (16)
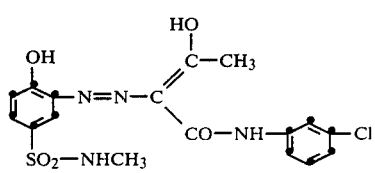
1:2 cobalt complex (17)
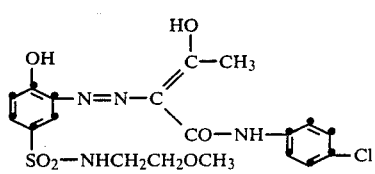
1:2 cobalt complex (18)
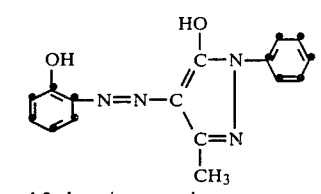
1:2 chromium complex (19)
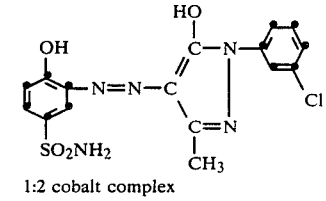
1:2 cobalt complex (20)
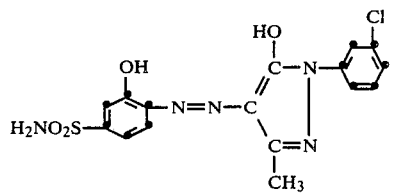
1:2 chromium complex (21)
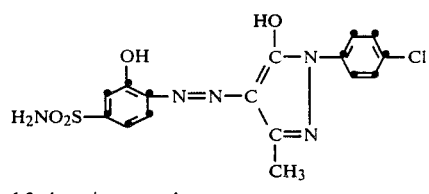
1:2 chromium complex (22)
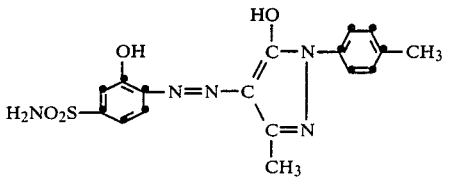
1:2 chromium complex (23)
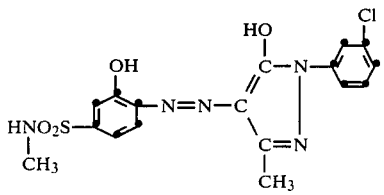
1:2 chromium complex (24)
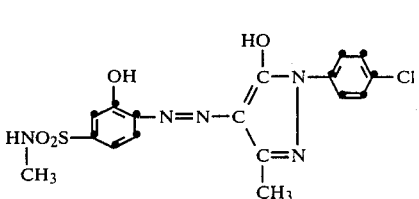
1:2 chromium complex (25)
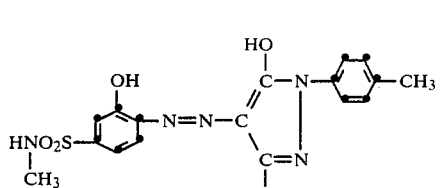
1:2 chromium complex (26)
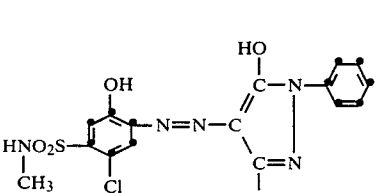
1:2 chromium complex (27)
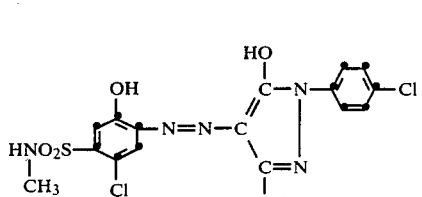
1:2 chromium complex (28)
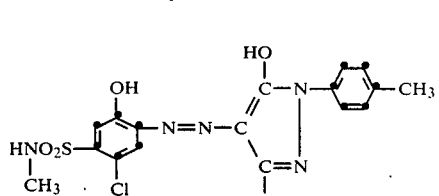
1:2 chromium complex (29)

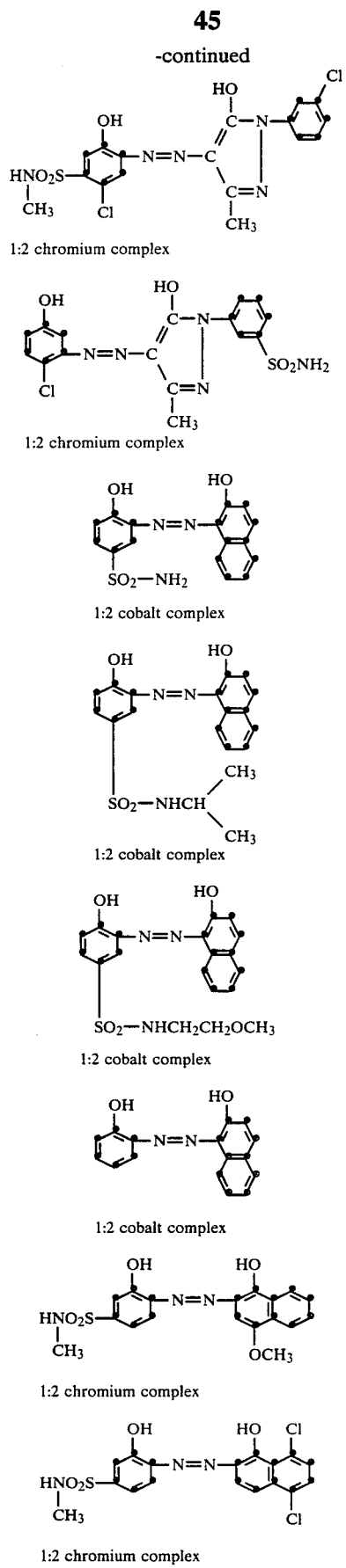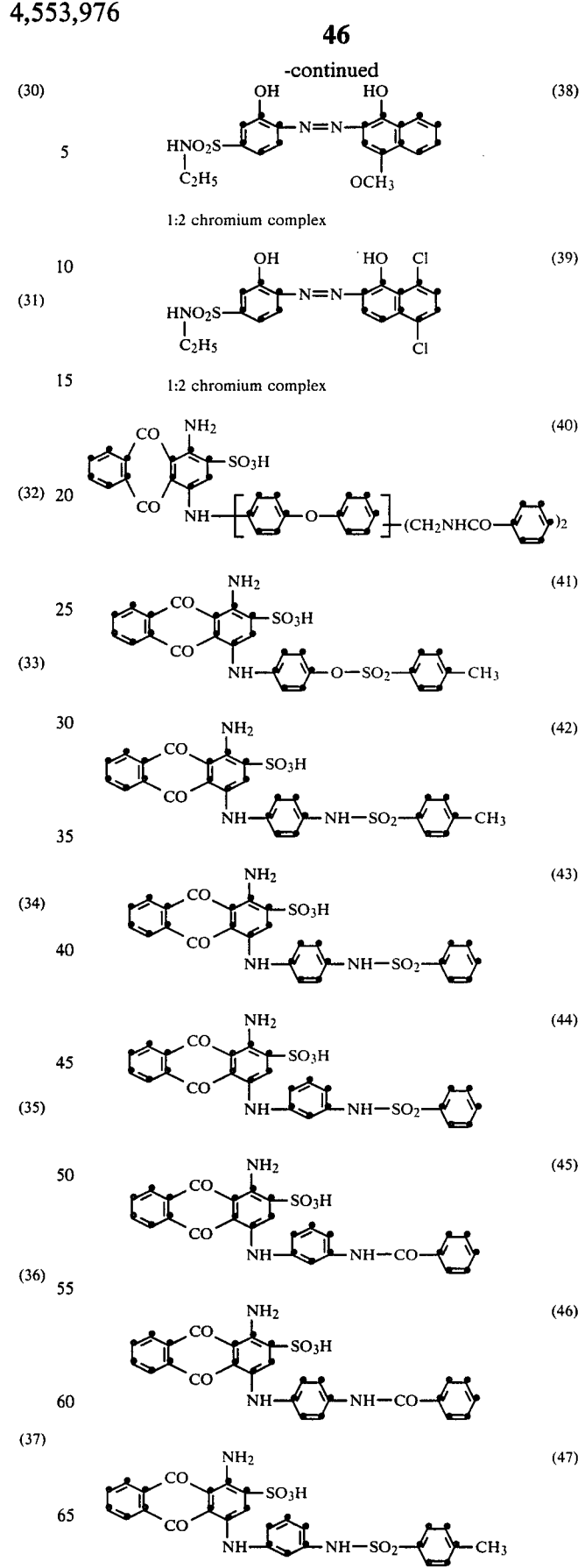

-continued

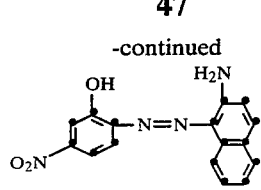

1:2 cobalt complex

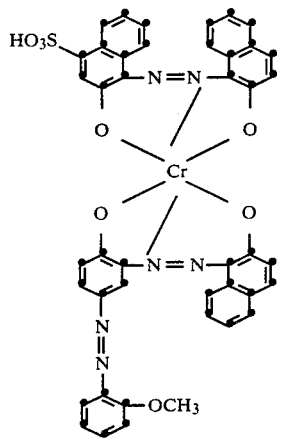 (49)

a mixture of the 1:2-chromium complexes of formulae (50), (50a) and (50b)

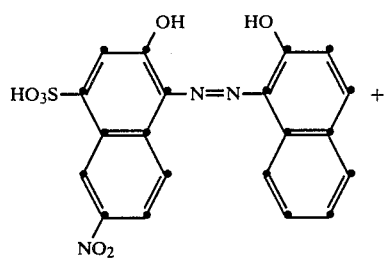 (50)

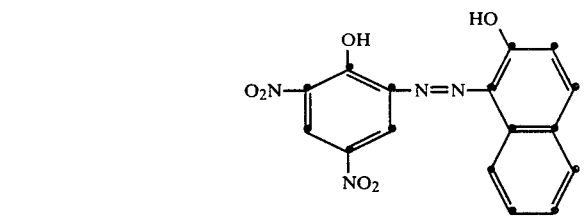

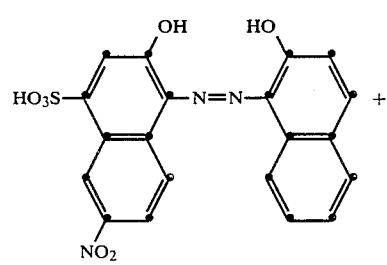 (50a)

-continued

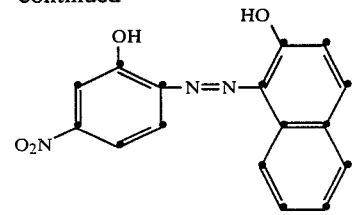 (48)

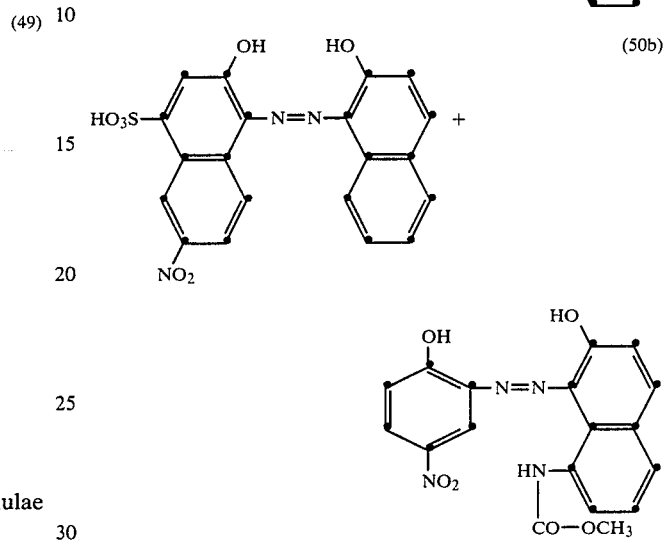

or the 1:2 cobalt mixed complex of the dyes of the formulae (31), (32) and (33).

4. A process according to claim 1 for producing combination shades, which comprises the use of a mixture comprising 3 or 4 dyes selected from the group consisting of the dyes of the formulae (1) to (10).

5. A process according to claim 1 for trichromatic dyeing or printing, which comprises the use of a mixture of 3 or 4 suitable yellow or orange, red and blue dyes selected from the group consisting of the dyes of the formulae (1) to (10).

6. A process according to claim 5, which comprises the use of a mixture which contains a dye of the formula (7).

7. A process according to claim 1, wherein the dyes or mixtures of dyes are used in aqueous dye liquors or printing pastes which optionally contain further ingredients.

8. A process according to claim 7, wherein the dyes or mixtures of dyes are used in short liquors.

9. A process according to claim 1, wherein the dyes or mixtures of dyes are used in the continuous foam dyeing method.

10. A process according to claim 1, wherein the dyes are fixed by steaming for 1 to 2 minutes.

11. A process according to claim 3, which comprises the use of 1:2 cobalt complexes of the formulae (11), (13), (20), (32), (33), (34) or (35), 1:2 chromium complexes of the formulae (19), (49) or (50), or 1:2 cobalt mixed complexes of the formulae (31), (32) and (33).

12. A process according to claim 1 for dyeing or printing polyamide carpeting material.

13. An aqueous dye liquor or printing paste which contains a mixture of 3 or 4 dyes selected from the group consisting of the dyes of the formulae (11) to (50).

14. An aqueous dye liquor or printing paste according to claim 13 which contains a dye of the formula (40).

* * * * *